United States Patent [19]
McGinnis et al.

[11] Patent Number: 5,399,304
[45] Date of Patent: Mar. 21, 1995

[54] MICROGRAVITY FORMATION OF POLYMERIC NETWORKS

[75] Inventors: Vincent D. McGinnis, Sunbury, Ohio; Jack R. Knox, Naperville, Ill.; Frank J. Jelinek, Westerville; Robert S. Whitmore, Jr., Columbus, both of Ohio

[73] Assignee: Battelle Memorial Institute, Columbus, Ohio

[21] Appl. No.: 900,807

[22] Filed: Jun. 17, 1992

[51] Int. Cl.$^6$ ............ B29C 41/24; B29C 41/50; B29K 105/04; C08J 9/14
[52] U.S. Cl. .................... 264/41; 264/204; 264/207; 264/53; 428/315.7; 521/50.5; 521/64; 522/3; 522/81; 522/183
[58] Field of Search ............... 522/3; 264/319, 204, 264/207, 41

[56] References Cited

U.S. PATENT DOCUMENTS

| | | | |
|---|---|---|---|
| 3,391,094 | 7/1968 | Childers | 260/2.5 |
| 3,666,133 | 5/1972 | Benning | 220/15 |
| 4,242,291 | 12/1980 | Hughes | 264/1 |
| 4,286,015 | 8/1981 | Yoshida et al. | 264/204 |
| 4,730,797 | 3/1988 | Minovitch | 244/159 |
| 4,791,162 | 12/1988 | Vanderhoff | 524/458 |
| 4,961,699 | 10/1990 | Moore | 425/387.1 |
| 4,978,451 | 12/1990 | Taylor | 210/500.27 |
| 4,981,625 | 1/1991 | Rhim | 522/5 |

Primary Examiner—Marion S. McCamish
Assistant Examiner—Mark A. Chapman
Attorney, Agent, or Firm—Mueller and Smith

[57] ABSTRACT

The present invention is directed to improving thermoplastic and cross-linked polymeric networks. The inventive method comprises forming the polymeric network under gravitational conditions comprising from about $10^{-6}$ to about $10^{-2}$ g. Three modes of energy transfer have been recognized, inter alia, conduction, convection, and radiation. Polymeric networks formed under microgravity conditions (defined herein as gravitational conditions comprising from about $10^{-6}$ to about $10^{-2}$ g) do not obviate conduction and radiation modes of energy transfer. Convection energy transfer, however, is gravity dependent. Thus, convection currents can be suppressed in thermoplastic and cross-linked polymeric networks during network formation by forming the network under microgravity conditions. Suppression of convection currents reduces the incidences of voids in solvent cast thermoplastic polymeric membranes, which forms yet another aspect of the present invention. Particulate-filled thermoplastic and cross-linked polymeric networks will exhibit a more homogeneous distribution of particulates in the network by forming the network under microgravity conditions also, which forms yet a further aspect of the present invention.

3 Claims, 32 Drawing Sheets

5,399,304

MICROGRAVITY FORMATION OF POLYMERIC NETWORKS

STATEMENT OF GOVERNMENT RIGHTS

The Government of the United States has rights in this invention as provided for by the terms of Contact No. NAGW-811 awarded by the National Aeronautics and Space Administration.

BACKGROUND OF THE INVENTION

The present invention relates to the formation of thermoplastic and cross-linked polymeric networks and more particularly to improving the physical properties thereof by controlling gravitational conditions during the POLYMERIC network formation.

It is known that when a polymer is cast from a volatile solvent solution, a large temperature gradient and concentration gradient occurs within a very short time period which gradients strongly influence the type of film structure formed under these conditions. Polymer membrane structures are very sensitive to the type of polymer, the type of solvents used to dissolve and cast or quench the film structure, and the rate of evaporation used to prepare the membrane. Conventional gas separation membrane technology has been reported to be moving towards thinner and more dense film structures (even plasma polymerized film structures) having high strengths and very small (e.g., 1,000 A and below) pore size structures. The use of high pressure to create polymer structures with dense film structures and small pore sizes for enhanced separation/selectivity and membrane properties has been reported. The use of polymer membranes in application areas where the pore sizes are much larger, e.g., on the order of 5-200 $\mu$m (micro filtration), depends on factors including defects, strength, permeability, selectivity, and like factors. Thin films having controlled morphology in the area of non-linear optical (NLO) opto-electronic devices is yet another area of current research endeavors in thin film or membrane processing technology.

Polymer membrane structures have been proposed for a wide variety of uses including, for example, separations (gas, liquid, or combinations), purification, enrichment, as protective layers, adhesives, and even as artificial skins. Nevertheless, approximately 60% of synthetic polymeric membranes currently are utilized as semipermeable barrier layers in the separations industry. Another polymer membrane structure receiving attention involves asymmetric polymer membranes. Such membranes are prepared by a process known as "phase inversion" and essentially involves casting of a polymer/solvent solution into a thin layer on a smooth solid surface, subjecting the solution to an evaporation step in which some of the solvent volatilizes, and a precipitation step where the polymer/solvent film is immersed into a bath of non-solvent. The resulting membrane consists of a thin dense skin layer which behaves as a semi-permeable barrier controlling the permeation and rejection properties of the membrane and a thick porous layer which provides support and structural integrity for the skin to withstand the imposed mechanical stresses. Polymer Preprints, Vol. 30, No. 1, pp 36–37 (April 1989). Further information on polymer membrane structures can be found in "Permeation of Carbon Dioxide through Homogeneous and Asymmetric Polysulfone Membranes", *Journal of Polymer Science: Part B: Polymer Physics*, Vol. 27, 919–927 (1989); "Perm Selective Membranes Separate Gases", *Chemtech*, 232–238 (April 1986); and "Membranes and Films from Polymers", *Journal of Chemical Education*, Vol. 63, No. 5, 414–417 (May 1986), the disclosures of which are expressly incorporated herein by reference.

Besides polymer membrane structures which may be influenced by gravity during the membrane formation, the processing of commercial polymeric materials involving the interaction of polymers with materials of different density (such as other polymers, metal particles or fibers, metal oxides, glass, carbon fibers, etc.) involve interactions of non-uniformity because of gravity-driven settling or dispersion of the different materials. To compensate for these dispersion effects, industry has developed special additives to help promote uniform interaction (e.g., by means of wetting, particle-particle repulsion, surface energy effects, etc.) among the different phases.

The foregoing polymeric network structures have physical properties which may be influenced by gravitational effects. The challenge is to apply gravity for improving the properties desired in polymer membrane structures and bulk polymer network articles.

BROAD STATEMENT OF THE INVENTION

The present invention is directed to improving thermoplastic and cross-linked polymeric networks. The inventive method comprises forming the polymeric network under gravitational conditions comprising from about $10^{-6}$ to about $10^{-2}$ g. Three modes of energy transfer have been recognized, inter alia, conduction, convection, and radiation. Polymeric networks formed under microgravity conditions (defined herein as gravitational conditions comprising from about $10^{-6}$ to about $10^{-2}$ g) do not obviate conduction and radiation modes of energy transfer. Convection energy transfer, however, is gravity dependent. Thus, convection currents can be suppressed in thermoplastic and cross-linked polymeric networks during network formation by forming the network under microgravity conditions. Suppression of convection currents reduces the incidences of voids in solvent cast thermoplastic polymeric membranes, which forms yet another aspect of the present invention. Particulate-filled thermoplastic and cross-linked polymeric networks will exhibit a more homogeneous distribution of particulates in the network by forming the network under microgravity conditions also, which forms yet a further aspect of the present invention.

Advantages of the present invention include thermoplastic and cross-linked polymeric networks that exhibit improved toughness, stress resistance, and crack resistance. Another advantage are polymer membranes that exhibit reduced incidences of voids. Yet another advantage is the production of particulate-filled polymeric networks that exhibit a more homogeneous distribution of particulates in the network. Yet a further advantage is the ability to suppress convection currents formed during polymeric network formation with concomitant physical property improvement achieved thereby. These and other advantages will be readily apparent to those skilled in the art based upon the disclosure contained herein.

DETAILED DESCRIPTION OF THE INVENTION

Figure 1:
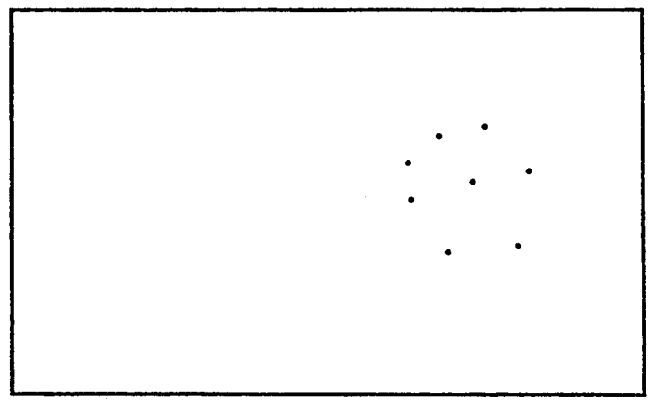
FIG. 1 is a diagrammatic representation of an SEM photomicrograph showing the electron density map of an Ag/graphite-filled polymeric composite polymerized under normal gravitational conditions.

While some authors have speculated on the influence that reduced gravitational conditions would have during the formation of polymeric networks, most reported work has involved the application of higher gravity conditions in order to improve certain physical properties of polymeric networks. The lack of availability of facilities to achieve microgravity conditions definitely has limited research endeavors in this field. The present invention reports several new unexpected, startling, and exciting results that have been achieved by forming thermoplastic and cross-linked polymeric networks under microgravity conditions. Unexpectedly, gravity has been found to influence not only thin films, but also significantly influence the properties of bulk polymeric networks. Microgravity conditions will be discussed below in connection with the improvement of physical properties of the cured polymeric network in general, in the formation of polymer membranes, and finally in the formation of polymer composites.

With respect to solvent-cast thermoplastic polymeric membranes, it will be understood that convective heat transfer has been eliminated by formation of the membrane under microgravity conditions. Thus, there no longer is convection controlled surface evaporation during membrane formation which results in surface cracking. Rather, membrane formation now is diffusion controlled, i.e. diffusion of the solvent from the forming membrane. Polymeric membranes formed under microgravity conditions exhibit virtually no void fraction or porosity by virtue of the conditions of formation. The cellular structure of the resulting polymeric membrane, and any voids present, are characterized by being very smooth-walled and regular in size, shape, and distribution. Equivalent films formed under normal gravitational conditions and under 2 g, for example, exhibit a significant void fraction and the voids are characterized by irregular walls and irregular size and shape of the voids. With gravitational effects eliminating convection heat transfer phenomena during the membrane formation, characteristics of the membrane now can be controlled by other influencing factors including the type of solvent(s) used, the rate of evaporation of the solvent from the membrane being formed, and similar factors not influenced by gravity. In fact, the formation of asymmetric polymeric membranes can be enhanced by practicing the solvent evaporation step under microgravity conditions as taught herein.

With respect to composites, when the liquid polymeric material to be cured contains particulate matter, uniformity of distribution of the particulates in the cured polymeric network is desired. Difficulties are encountered regardless of whether the particulates are of high or low density relative to the liquid polymeric material in which they are dispersed. Some classes of particulates tend to agglomerate or stick together independent of density considerations. Problems are exacerbated when a bimodal or polymodal filled system is being handled, especially when significant density variances between the particles are encountered. Cure of particulate-filled thermoplastic or cross-linked polymeric networks under microgravity conditions renders the density of the particulates a non-factor in the filled system. Thus, the formulator now has the ability to utilize any combination of particulates without worrying about homogeneity and dispersibility considerations. Moreover, the tendency of the particulates to agglomerate or clump apparently is lessened under the microgravity conditions prevailing during the polymeric network formation. The resulting cured filled polymeric network, regardless of shape and size, is expected to exhibit improved properties by virtue of the particulate homogeneity. In fact, the improved homogeneity may result in the need for a lower concentration of particulates in some applications.

With respect to unfilled bulk thermoplastic or cross-linked polymeric networks, initial expectations were not hopeful with respect to physical property improvement by virtue of the microgravity conditions prevailing during network formation. After all, the same reactants are reacting in the same manner to form the same reaction product independent of gravitational considerations. To the extent that the degree of cure and the curing conditions are equivalent, the influence of gravity seemed speculative at best. Despite such expectations, it has been discovered that thermoplastic and cross-linked polymeric network structures are more stable when cured under microgravity conditions. Stability testing involved placing the cured polymeric network structure in a solvent therefor and measuring the rate of solvent absorption and the rate of polymer disintegration by virtue of the solvent. The data will reveal the unexpected, yet dramatic stability improvement of the microgravity cured samples.

The polymeric network structures additionally are tougher when made under microgravity conditions and are more resistant to stress and cracking. While the precise explanation for these physical property improvements has yet to be confirmed, it is believed that the convection current suppression by the absence of gravity appears to improve the polymeric network formation resulting in a higher quality cure and cured product. The convection current suppression effect on bulk polymer systems indeed was unexpected, yet quite valuable. Formation of polymeric network structures of improved stability, stress resistance, and crack resistance, for example, applies equally to filled and unfilled systems and is independent of the shape and size of the resulting article. Thus, improvement in the physical properties of membranes will result as well as will the improvement in porosity suppression, reported above.

With respect to the nature of the thermoplastic or cross-linked polymeric compositions, the application of microgravity conditions during curing transcends polymer composition. Thus, the invention has applicability to vinyl and acrylic polymeric systems, unsaturated polyester systems, cellulose systems, epoxy resins, polyurethane and related systems, amine and phenol-formaldehyde resin systems, robber and silicone resin systems, polysulfone systems, and the like, independent of whether a thermoplastic or cross-linked system is involved. In this regard, curing by heat, ultraviolet radiation, infrared radiation, or the like, is equally applicable and comprehended within the cross-linked polymeric network structures of the present invention, as is the presence and absence of catalysts. An exhaustive listing of classes and types of thermoplastic and cross-linked polymeric systems will not be delineated herein but such terminology is to be interpreted to include all known and future polymeric systems to be developed. Such broad definition is appropriate since the improvements achieved by application of microgravity conditions involve energy transfer phenomena which is a property inherent in all polymeric systems and the dispersion of particulate matter in a liquid system that is to be converted to a solid or solidlike (e.g. gel) state.

With respect to the achievement of microgravity conditions, use of drop towers and special airplane flight paths are but two methods of microgravity conditions that can be achieved on earth. The greatest applicability of the present invention, however, involves the formation of the polymeric network structures in space aboard a space shuttle or similar vehicle, or aboard an orbiting space station. Data will be presented in the Examples utilizing all three forms of microgravity conditions.

Of perhaps more immediate practical importance are the lessons that the invention teaches in the preparation of polymeric network structures under gravitational conditions prevailing on the earth. That is, now that the importance of elimination of convection energy transfer has been recognized, the artisan is challenged to reduce convection heat transfer by means other than microgravitational conditions. Perhaps, special heat transfer means can be constructed that eliminate convection as a significant energy transfer phenomena during the formation of the polymeric network structures. It may be that even the partial elimination of some convection heat currents will result in improved polymeric network structures to a degree.

The following Examples show how the present invention has been practiced, but should not be construed as limiting. In this application, all units are in the metric system and all percentages and parts are by weight, unless otherwise expressly indicated. Also, all citations referred to herein are expressly incorporated herein by reference.

EXAMPLES

Example 1

Samples of a mixture of 1,6-hexanediol diacrylate, trimethylolpropane triacrylate, and a photoinitiator system (50/45/5 weight parts, respectively) were placed in a small 3 ml or 0.5 ml test tubes and sealed with a cork stopper. The photoinitiator system was camphorquinone (2 wt. parts) and methyldiethanolamine (3 wt. parts). Three test tube samples were placed between two commercial photographic flash lamps (Metz 45 CT-3 photographic flash lamps with major output in the 400 nm region) which could be set to fire at various delay times.

The system was taken to the top of an 8 story drop tower facility located at the NASA Lewis Research Center in Cleveland, Ohio. The total time for obtaining microgravity is 2.2 seconds. Microgravity is achieved by letting the experimental equipment drop the entire height of the 8 story drop tower. This drop occurs over the 2.2 second time period and the equipment is recovered from a fluidized sand bed at the bottom of the tower.

The experimental equipment rides (free floats) inside a metal housing that is fitted with a drag shield on the bottom side of the metal housing. When the entire assembly is dropped, the metal housing containing the experimental equipment actually is suspended in air during the entire free-fall time period. This arrangement permits a high degree of control for obtaining a microgravity ($10^{-6}$ g) environment. Once the equipment starts into the free-fall, a timer is initiated so that the flash lamps will fire off between 0.5 and 1 second into the free-fall period. This operative sequence assures that the microgravity environment will be reached at the point in time that the flash lamps initiate the chemical reaction in the test tubes.

When the flash lamps are activated, the reactive photoactive liquid system inside the test tubes converts rapidly into a solid-like gel or immobile polymeric material. This liquid-to-gel-to-solid photopolymerization process occurs in less than 0.1 second, thus assuring that the reaction takes place and is fully completed within the microgravity environment time frame provided by the drop tower facility.

Ground base control studies were effected using the same experimental equipment, identical reactive liquid photocurable mixture, and with the same flash lamp exposure times as the microgravity prepared samples. Cure, however, takes place under prevailing earth gravity conditions at the NASA research facility.

The gelled polymeric materials prepared by both ground base and microgravity techniques were removed from the test tubes and placed in methylene chloride or ethylacetate solvents, and evaluated for their ability to swell and absorb solvent without undergoing severe fracture and loss of cylindrical integrity. The following results were recorded.

TABLE 1

| Sample | Tune to Reach Equilibrium Swelling By Solvent (hrs) | Time to Reach Total Destruction By Solvent (hrs)* |
|---|---|---|
| Ground Base Controls | | |
| E | 2 | 5-6 |
| F | 2 | 6 |
| G | 2 | 6 |
| H | 2 | 6 |
| Microgravity Samples | | |
| A | 4-5 | 12 |
| B | 4-5 | 12 |
| C | 4-5 | 12 |
| D | 4-5 | 12 |

*Fracture of the sample into small pieces.

As the above-tabulated demonstrates, in all samples the microgravity prepared samples exhibited significantly longer time periods to reach equilibrium swelling of the solvent and maintained their physical shape integrity over a much longer time period than did their ground base control counterparts. All of the ground base control samples reached their equilibrium swelling points within 2 hours and then immediately began to fracture and break up into tiny pieces with a total time period of 5 to 6 hours. The corresponding time periods for the microgravity samples, however, were substantially longer for both equilibrium swelling (4-5 hours) and for destruction (12 hours). The physical properties of the cured samples, then, were enhanced significantly by maintaining microgravity conditions during curing.

Example 2

A reactive two-component acrylate system was used to determine the effects of reduced gravity on a polymerization gelling reaction using a Lear jet parabolic flight path to generate microgravity conditions. The acrylate system tested was 1,6-hexanedioldiacrylate and glycerol propoxy triacrylate (50/50 by weight) blended with 2 wt-% benzoyl peroxide initiator. The organic redox catalyst, N,N-dimethyl-p-toluidine, could be pumped into the reaction mixture to initiate the reaction which was complete within a 20 second time period. The time frame for the Lear jet to achieve the reduced gravity environment is over this 20 second time period. Thus, just before the plane came out of its dive-ascent and level-off period (parabolic flight path), the catalyst must be injected into the acrylate reaction mixture. Once the reaction was initiated with the catalyst, the liquid gels into a rigid structure and is immobilized. The entire reaction sequence of liquid-to-gel-to solid takes place within the 20 second level-off period of the flight which is in the region of $10^{-2}$ g.

Ground base control samples were prepared in exactly the same manner as the Lear jet microgravity samples, but the Lear jet flight was carded out at a level flight path (i.e., no parabolic flight path).

The gelled samples were removed from the sample vial holders and placed in solvent (methylene chloride or ethyl acetate) and measured for their ability to absorb solvent without undergoing fracture, decomposition, or loss of their physical shape. The following data was recorded.

TABLE 2

| Sample | Time to Reach Equilibrium Solvent Swelling (hrs) | Time to Begin Initial Degradation Process (hrs) | Time to Reach Total Failure (hrs)* |
|---|---|---|---|
| Lear Jet Controls | | | |
| A | 1-2 | 6 | 12-20 |
| B | 1-2 | 6 | 12-20 |
| C | 1-2 | 6 | 12-20 |
| Lear Jet Microgravity | | | |
| D | 6-12 | >20 | >40 |
| E | 6-12 | >20 | >40 |
| F | 6-12 | >20 | >40 |

*Complete loss of physical shape and properties.

In all cases, the level Lear jet flight path samples absorbed the solvents very quickly and rapidly disintegrated into small pieces within a 6 to 20 hour time period. The microgravity Lear jet flight path samples, however, required 6 to 12 hours just to reach equilibrium solvent swelling values and did not show any sign of disintegration after a 40 hour time period. Again, the affect on physical properties that microgravity curing has is demonstrated.

Example 3

Trimethylolpropane triacrylate (TMPTA) was combined with benzil (0.5 wt-%) and N-methyldiethanolamine (3 wt-%) to form a reaction mixture for curing in the drop tower configuration of Example 1. In this case, however, particulates were dispersed in the reaction mixture in order to assess dispersion phenomena of polymer composites subjected to cure under microgravity conditions compared to gravity conditions.

In initial studies, 3 ml samples of the reaction mixture were combined with 0.1 g of either iron powder or copper powder. The samples were agitated and then subjected to curing through use of the flash lamps, as in Example 1. In all samples tested, improved phase dispersion of particulate material was evident for the microgravity samples provided that the samples were first agitated. When no agitation preceded cure, poor dispersion was evident independent of the gravity curing conditions.

Samples of these composites were subjected to a Leitz Miniload 2 Micro-Hardness tester with the following results being recorded.

TABLE 3

| Sample Position | Ground Base Control (Indentation, $\mu$) | Reduced Gravity (Indentation, $\mu$) |
| --- | --- | --- |
| Copper Composite | | |
| Top | 89 | 57 |
| Middle | 86 | 40+ |
| Bottom | 80 | 58 |
| Iron Composite | | |
| Top | 72 | 65 |
| Middle | 89 | 49 |
| Bottom | 88 | 69 |

This data shows that the ground base control samples were softer than the reduced gravity samples prepared by the drop tower. A corresponding hardness improvement along with improved particle dispersion, thus, is demonstrated.

Figure 2:
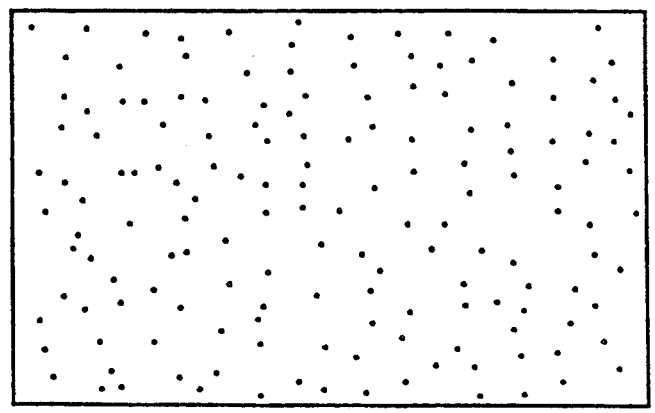
FIG. 2 is a diagrammatic representation of an SEM photomicrograph showing the electron density map of an Ag/graphite-filled polymeric composite polymerized under microgravity conditions in accordance with the present invention.
Figure 3:
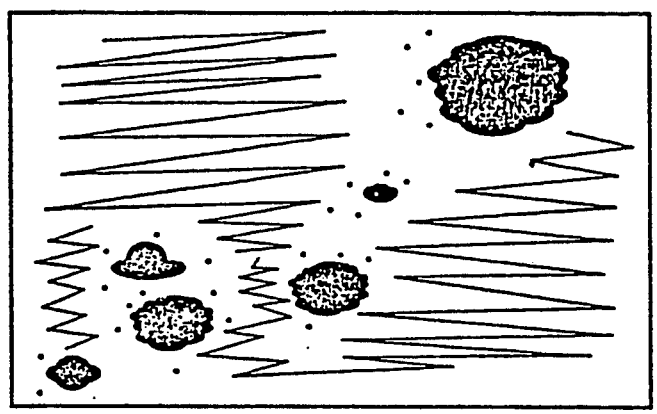
FIG. 3 is a diagrammatic representation of an SEM photomicrograph showing the electron density map of an $MoS_2$/PTFE-filled polymeric composite polymerized under normal gravitational conditions.
Figure 4:
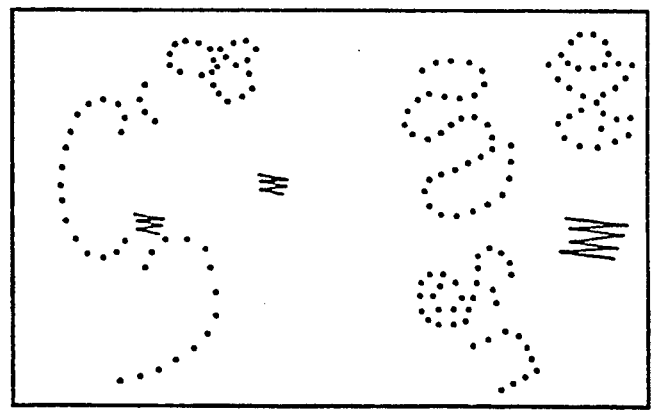
FIG. 4 is a diagrammatic representation of an SEM photomicrograph showing the electron density map of an $MoS_2$/PTFE-filled polymeric composite polymerized under microgravity conditions in accordance with the present invention.

Next mixed density samples were prepared containing 6.7 mg $MoS_2$ and 19.8 mg polytetrafluoroethylene (PTFE). Similar experiments also were conducted using Ag (7.0 mg) and graphite (20 mg) dispersions. Again, it was very apparent that microgravity conditions had a beneficial effect on the mixed density particle dispersion phenomena. The control samples (1 g) under agitation dispersed the PTFE particles, but not the denser $MoS_2$ particles. Similar results were observed with the Ag-graphite powder system. However, these same experiments conducted under microgravity conditions produced by the drop tower produced composite structures with both the less dense (PTFE or graphite) and the more dense (Ag or $MoS_2$) particles dispersed together. These results are represented at FIGS. 1-4 which are diagrammatic representations of scanning electron microscopy (SEM) photomicrographs or electron density maps of the cured samples. In particular, FIG. 1 shows the Ag/C control sample wherein it is evident that the denser Ag particles are not uniformly dispersed. FIG. 2, however, evidences good uniform Ag dispersion due to the 2 second microgravity drop tower cure. Note, that graphite does not show up on the SEM micrographs. The same results hold true for the $MoS_2$/PTFE samples where FIG. 3 represents the control samples which clearly show lumping of the particles. FIG. 4 microgravity samples, however, evidence a much more uniform dispersion without the lumping apparent in the 1 g control samples.

Example 4

Figure 5:
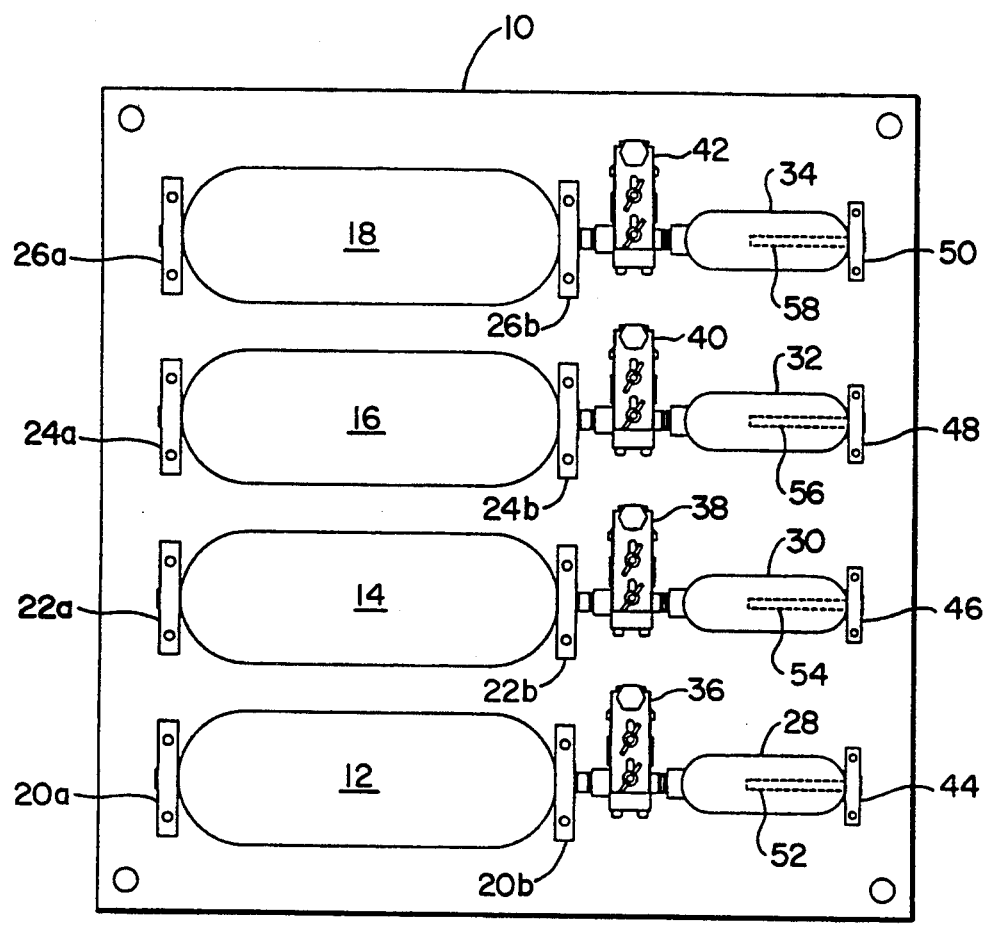
FIG. 5 is a simplified plan view of experimental equipment utilized in the preparation of polymer membranes under microgravity conditions.

The preparation of polymer membranes was studied using a solution of Amoco Udel 1700 polysulfone in N,N-dimethylacetamide and acetone (25/55/20 weight parts, respectively). The experimental equipment used to form the membrane structure, via a vacuum evaporation process, is shown in FIG. 5. Mounting plate 10 is seen to mount vacuum chambers 12, 14, 16, and 18 by mounts 20, 22, 24, and 26. The vacuum chambers, evacuated to approximately 0.1 mm Hg are separated from membrane cylinders 28, 30, 32, and 34 by manual valve assemblies 36, 38, 40, and 42. The membrane cylinders are mounted to plate 10 additionally by mounts 44, 46, 48, and 50. Within membrane cylinders 28-34 are membrane sample tubes 52, 54, 56, and 58, respectively.

Experiments were conducted on a KC-135 aircraft which can provide both a high gravity (2 g) environment (20 secs) as well as a reduced gravity ($10^{-3}$ g) environment (20 secs) depending on the trajectory (ascent, level, descent) of the plane. When the desired environment was reached, the operator turned the valves which allowed the solvent to be vacuum evaporated into the large cylinder to form the solid membrane structure on the inside of the sample tube holder. The solid membrane film structure then was removed from the inside of the sample tube holder, vacuum pumped for 2 hours, and then subjected to SEM analysis. This method of sample holding was replaced with a more uniform sample preparation consisting of dipping the outside of the tube with a coating solution to achieve a uniform consistent coating structure.

Additional studies were conducted aboard Space Shuttle STS-31 (Apr. 24, 1990). Sample preparation involved the coating of the exterior of the sample tubes as explained above.

Ground base samples were produced under as close to the same evaporation and removal time-frame conditions as the flight samples. All of the film samples were subjected to SEM analysis techniques. Both room temperature and liquid nitrogen film sample fracture techniques were used to see if any differences resulted from the manner in which the samples were prepared for SEM analysis.

KC-135 Results

Figure 6A:
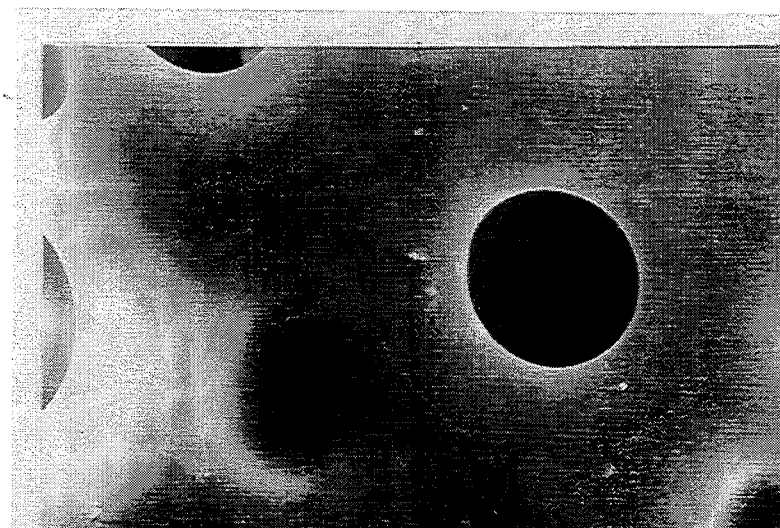
FIG. 6A is a photomicrograph at 5000× magnification showing the morphology of a face of a control polymeric membrane (Sample 31-14) which was solvent-cast under normal gravitational conditions.
Figure 6B:
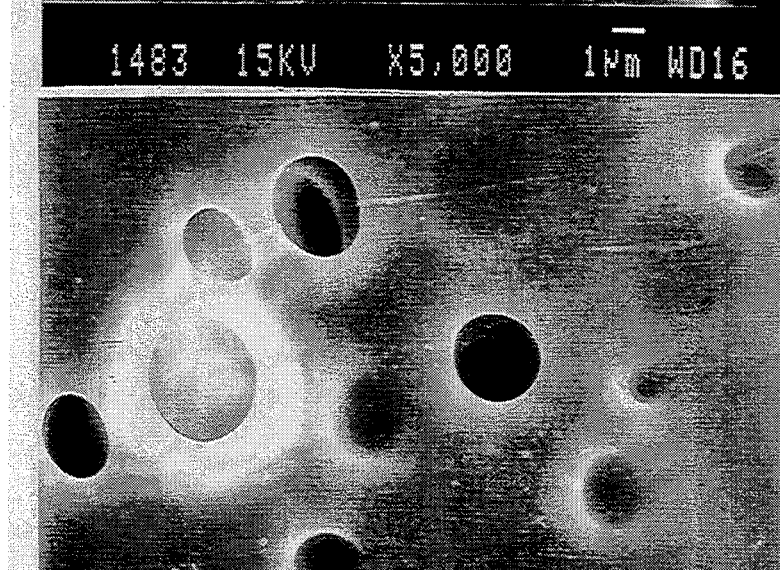
FIG. 6B is the photomicrograph of FIG. 6A shown at a magnification of 2500×.
Figure 6C:
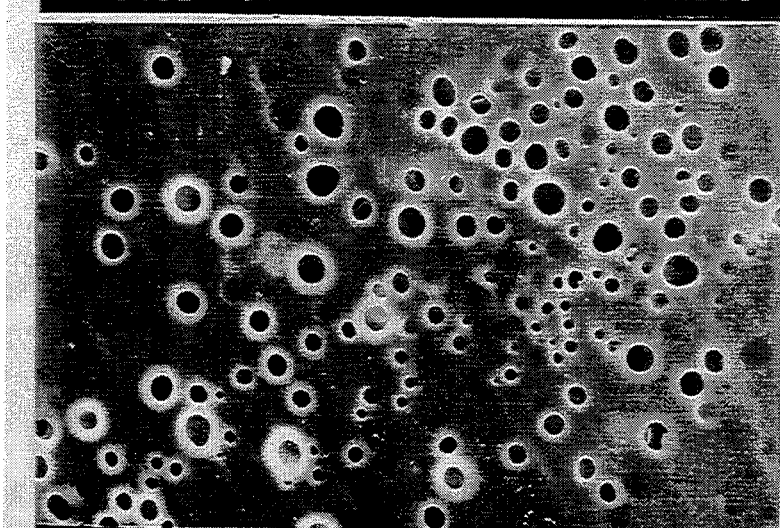
FIG. 6C is the photomicrograph of FIG. 6A shown at a magnification of 500×.
Figure 7A:
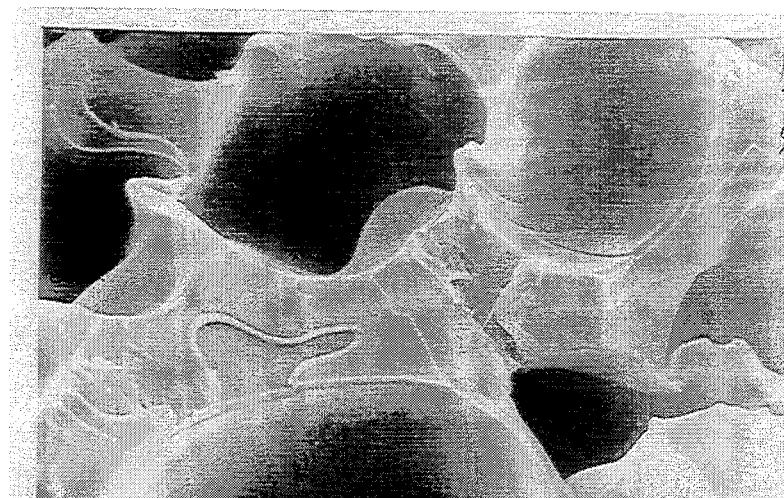
FIG. 7A is a photomicrograph at 5000× magnification showing the morphology of an edge of the polymeric membrane of FIG. 6A.
Figure 7B:
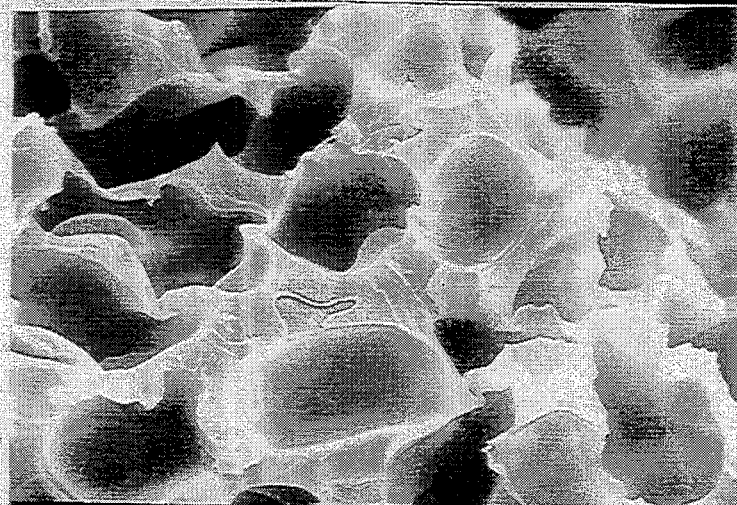
FIG. 7B is the photomicrograph of FIG. 7A shown at a magnification of 2500×.
Figure 7C:
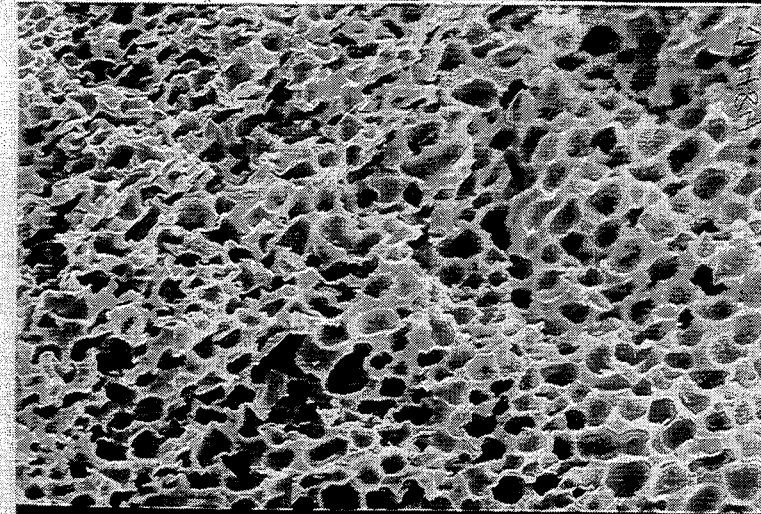
FIG. 7C is the photomicrograph of FIG. 7A shown at a magnification of 500×.

FIGS. 6A,6B,6C,7A,7B,7C,8A,8B,8C,9A,9B and 9C show the results of ground base studies (1 g) that were carded out using the identical equipment and procedures that were used for the KC-135 experiments. In the following discussion, a comparison will be made between face surfaces and edge fracture surfaces of the solid membrane film structures. FIGS. 6A,B,C shows the face of a ground base control sample (44520-31-14) which has sharp edge vesicle holes that are fairly regular or smooth and are approximately 5 $\mu$m in diameter. FIG. 7ABC shows the edge of ground base control sample 31-14 and its internal pore structures which are very ragged in texture or have rough edges and are irregular in their dimension. The average size of these internal pores is approximately 8-12 $\mu$m in diameter.

Figure 8A:
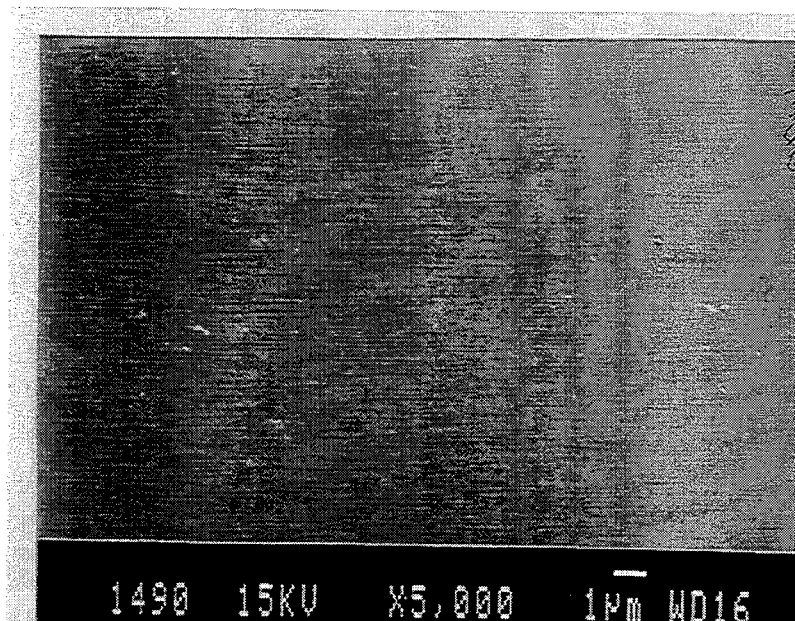
FIG. 8A is a photomicrograph at 5000× magnification showing the morphology of a face of a control polymeric membrane (Sample 31-15) which was solvent-cast under normal gravitational conditions.
Figure 8B:
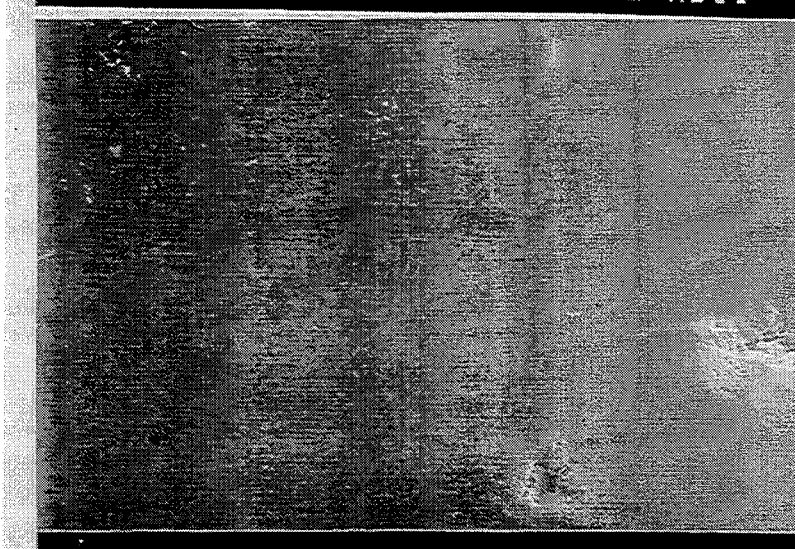
FIG. 8B is the photomicrograph of FIG. 8A shown at a magnification of 2500×.
Figure 8C:
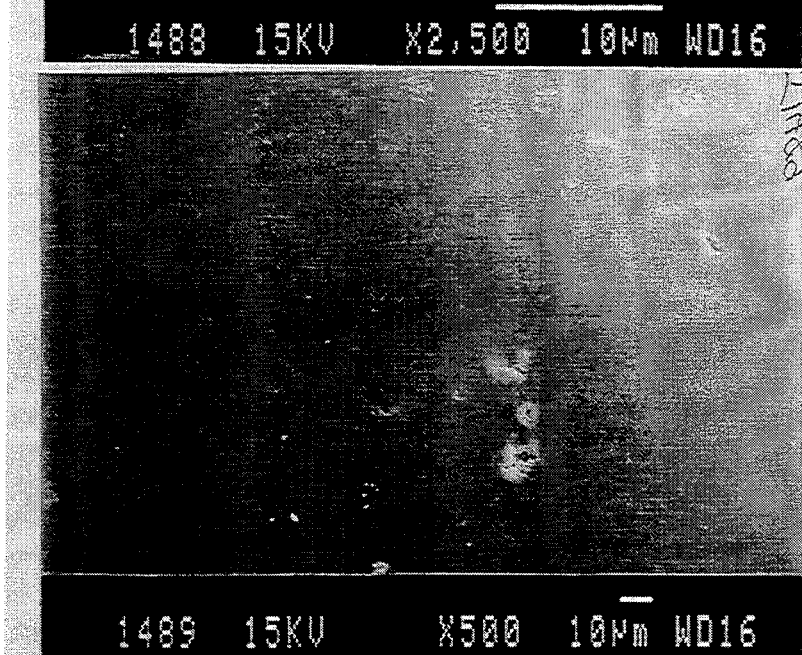
FIG. 8C is the photomicrograph of FIG. 8A shown at a magnification of 500×.
Figure 9A:
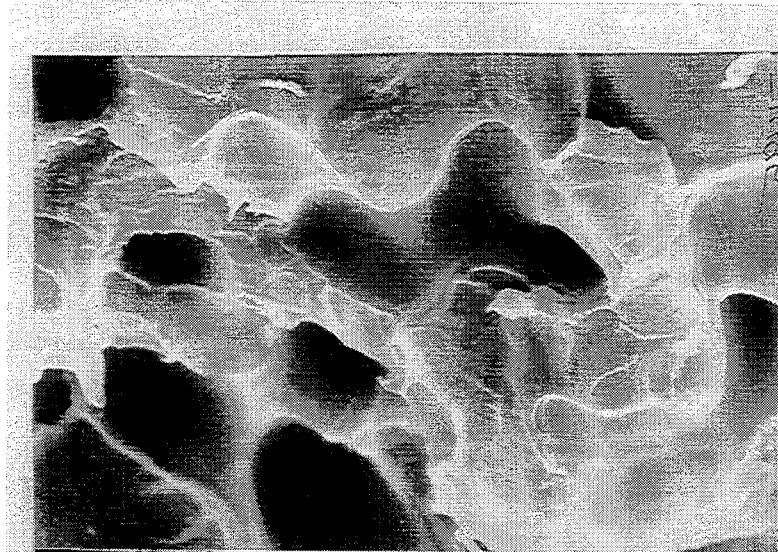
FIG. 9A is a photomicrograph at 5000× magnification showing the morphology of an edge of the polymeric membrane of FIG. 8A.
Figure 9B:
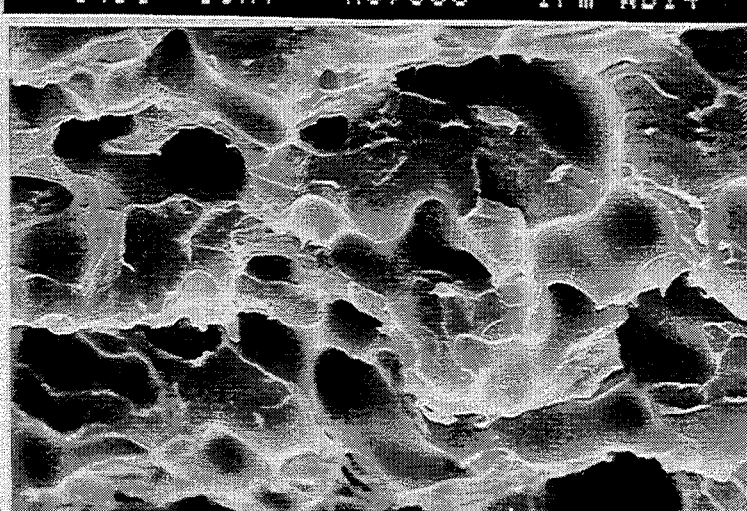
FIG. 9B is the photomicrograph of FIG. 9A shown at a magnification of 2500×.
Figure 9C:
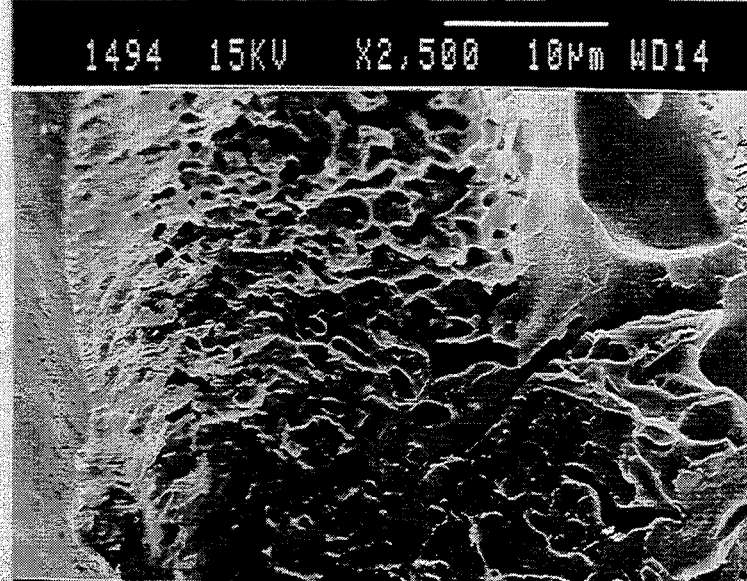
FIG. 9C is the photomicrograph of FIG. 9A shown at a magnification of 500×.

FIGS. 8ABC is another duplicate ground base control face sample (44520-31-15) having less surface porosity than sample 31-14 (FIGS. 6ABC), but the same type of irregular internal pore structures (FIGS. 9ABC) as sample 31-14 (FIGS. 7ABC). The irregular internal pore structures in FIGS. 9ABC (ground base control 31-15) also are approximately 8-12 $\mu$m in diameter.

Figures 10A, 10B, 10C:
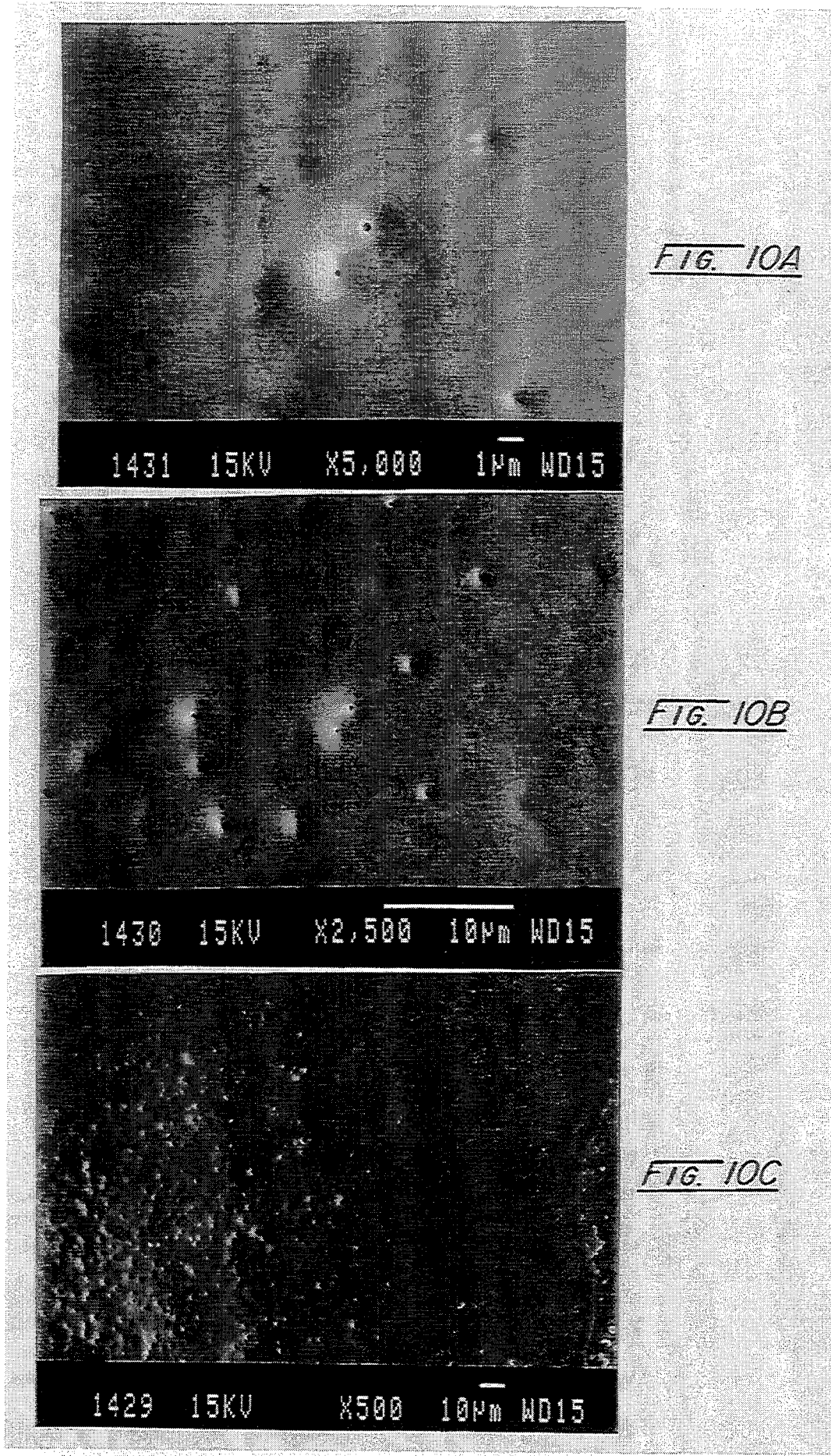
FIG. 10A is a photomicrograph at 5000× magnification showing the morphology of a face of an experimental polymeric membrane (Sample 31-6) which was solvent-cast under microgravity conditions according to the precepts of the present invention.
FIG. 10B is the photomicrograph of FIG. 10A shown at a magnification of 2500×.
FIG. 10C is the photomicrograph of FIG. 10A shown at a magnification of 500×.
Figures 11A, 11B, 11C:
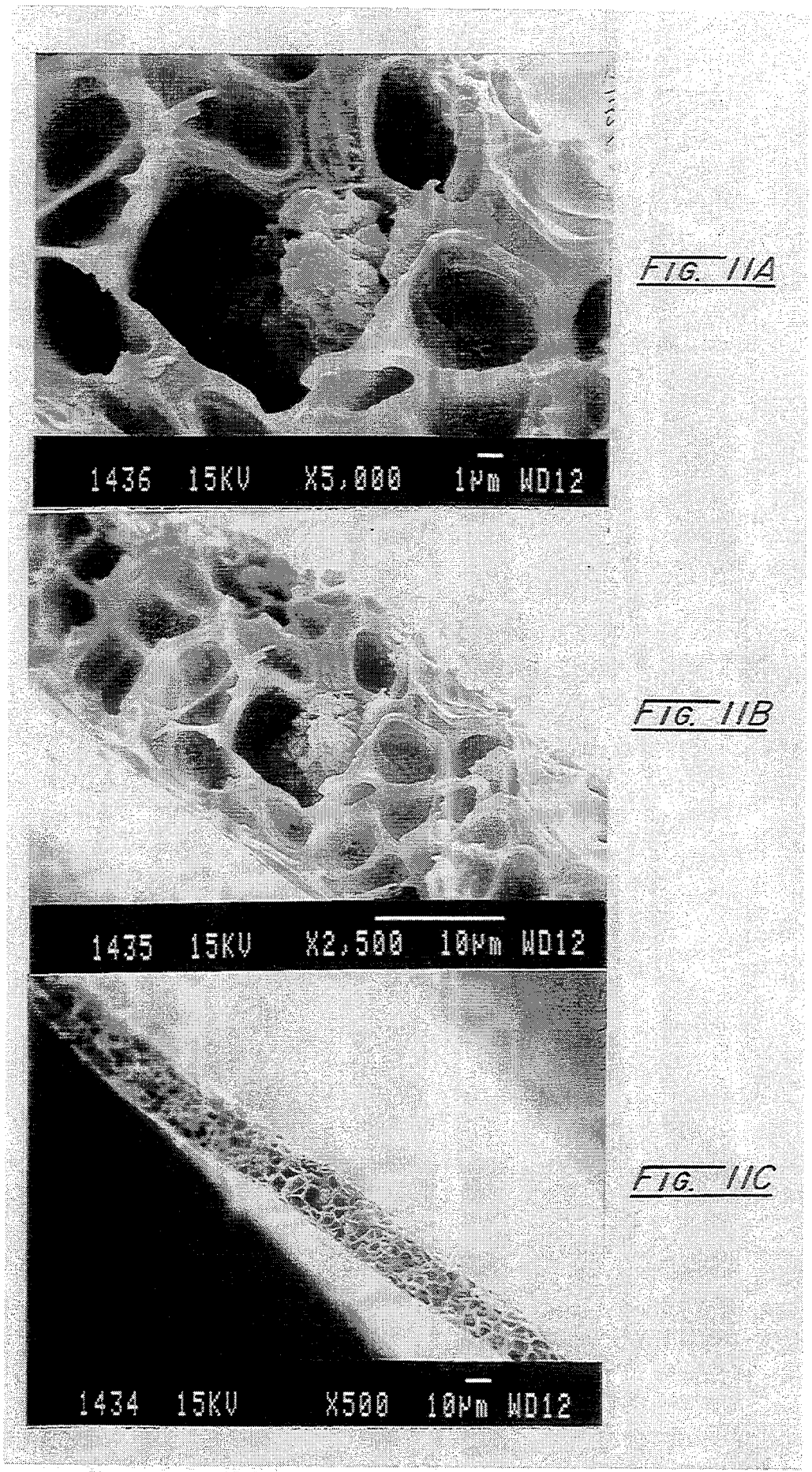
FIG. 11A is a photomicrograph at 5000× magnification showing the morphology of an edge of the polymeric membrane of FIG. 10A.
FIG. 11b is the photomicrograph of FIG. 11A shown at a magnification of 2500×.
FIG. 11C is the photomicrograph of FIG. 11A shown at a magnification of 500×.
Figures 12A, 12B, 12C:
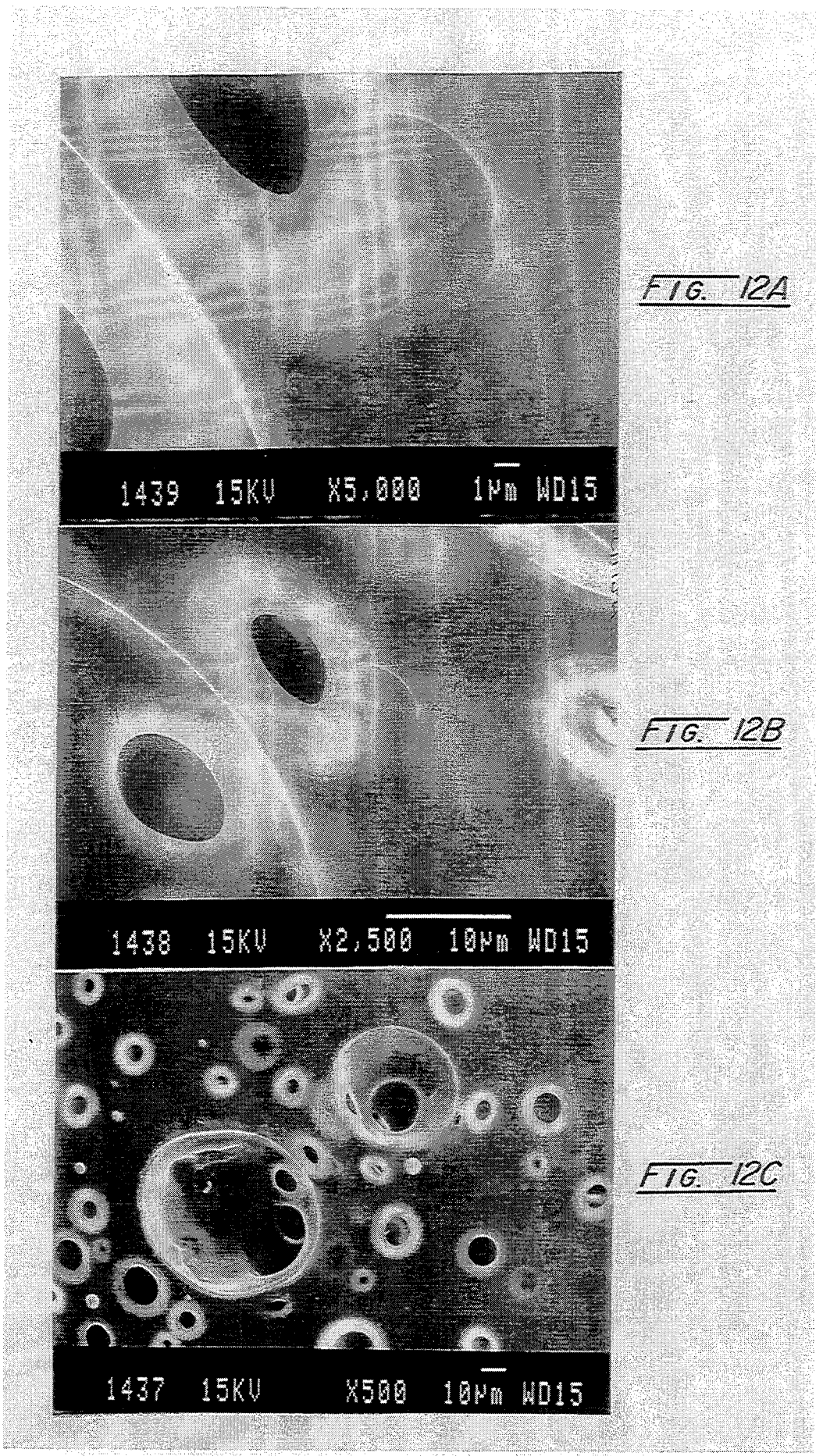
FIG. 12A is a photomicrograph at 5000× magnification showing the morphology of a face of an experimental polymeric membrane (Sample 31-7) which was solvent-cast under microgravity conditions according to the precepts of the present invention.
FIG. 12B is the photomicrograph of FIG. 12A shown at a magnification of 2500×.
FIG. 12C is the photomicrograph of FIG. 12A shown at a magnification of 500×.
Figure 13A:
FIG. 13A is a photomicrograph at 5000× magnification showing the morphology of an edge of the polymeric membrane of FIG. 12A.
Figure 13B:
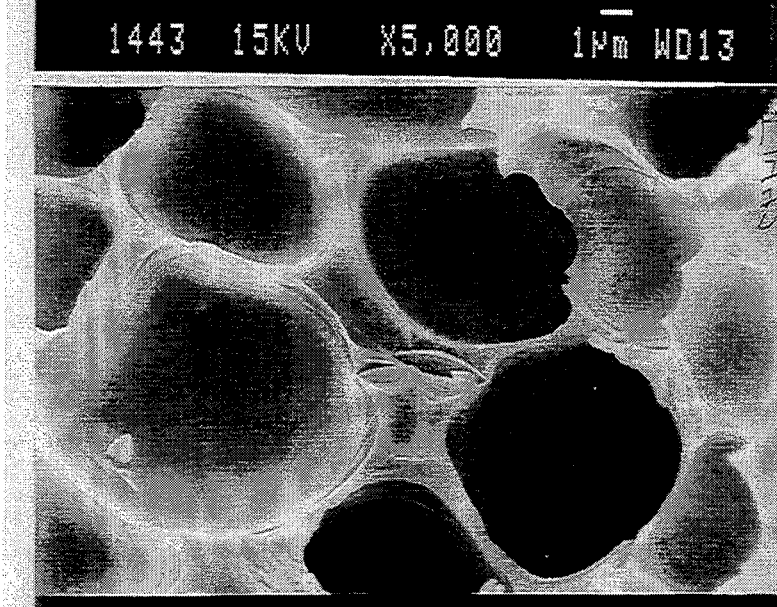
FIG. 13B is the photomicrograph of FIG. 13A shown at a magnification of 2500×.
Figure 13C:
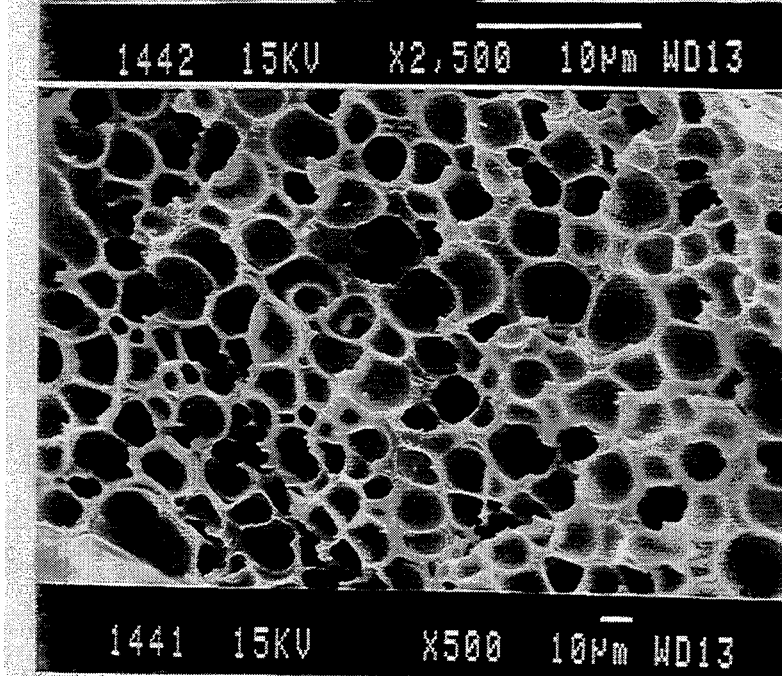
FIG. 13C is the photomicrograph of FIG. 13A shown at a magnification of 500×.

FIGS. 10A,10B,10C,11A,11B,11C,12A,12B,12C,-13A,13B and 13C are micrographs of the KC-135 high gravity (1.2-1.7 g) environmental effects on the membrane formation process. FIGS. 10ABC (Sample 44520-31-6) shows the effect of high gravity on the film surface in that all of the pores formed exhibit a depression or dimple effect. Examination of the edge structure of the high gravity formed membrane structures (FIGS. 8ABC, sample 31-6) shows somewhat irregular pore shapes, but not to the same degree as the ground base control samples (FIGS. 7ABC and 9ABC, samples 31-14 and 31-15, respectively) under the same evaporation rate control experiments. Similar results are observed in FIGS. 12ABC and 13ABC for samples 44520-31-7 (face view) and 31-7 (edge view), respectively. The pore size ranges on the face view samples (FIGS. 10ABC and 12ABC) are approximately 2 to 4 μm in diameter and the pore size ranges on the edge view samples (FIGS. 11ABC and 13ABC) are approximately 7 to 14 μm in diameter.

Figure 14A:
FIG. 14A is a photomicrograph at 5000× magnification showing the morphology of a face of an experimental polymeric membrane (Sample 31-1 ) which was solvent-cast under microgravity conditions according to the precepts of the present invention.
Figure 14B:
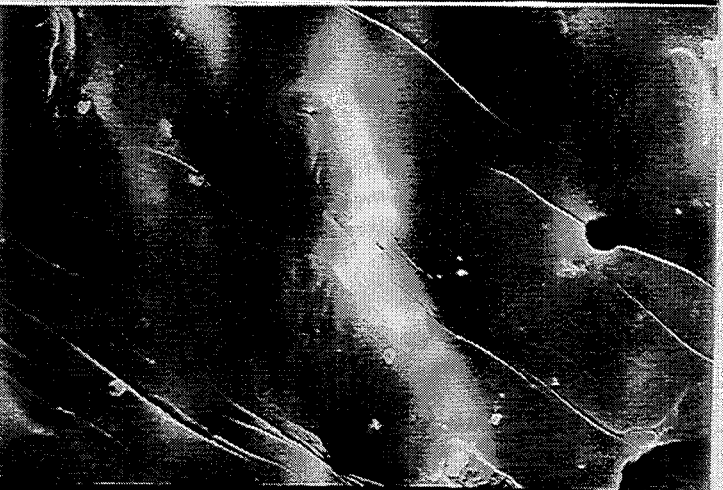
FIG. 14B is the photomicrograph of FIG. 14A shown at a magnification of 2500×.
Figure 14C:
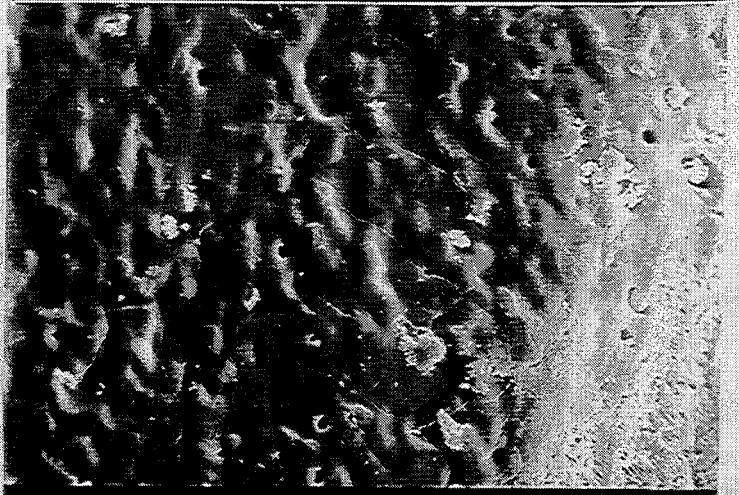
FIG. 14C is the photomicrograph of FIG. 14A shown at a magnification of 500×.
Figure 15A:
FIG. 15A is a photomicrograph at 5000× magnification showing the morphology of an edge of the polymeric membrane of FIG. 14A.
Figure 15B:
FIG. 15B is the photomicrograph of FIG. 15A shown at a magnification of 2500×.
Figure 15C:
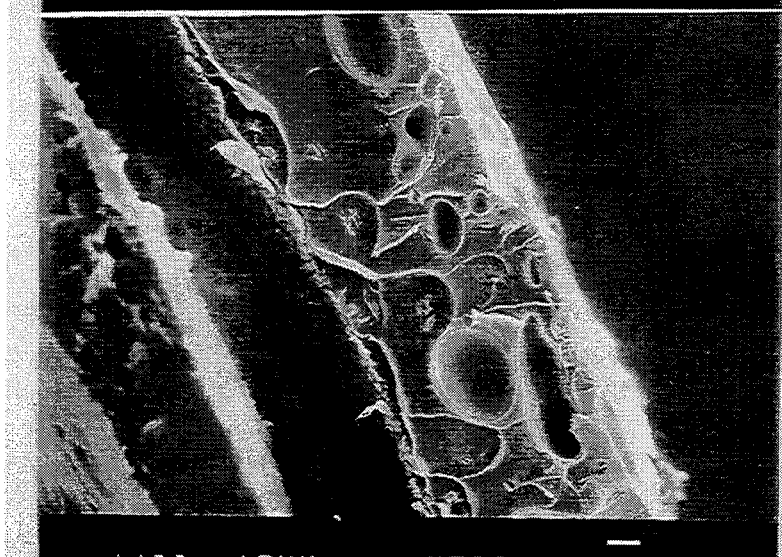
FIG. 15C is the photomicrograph of FIG. 15A shown at a magnification of 500×.
Figure 16A:
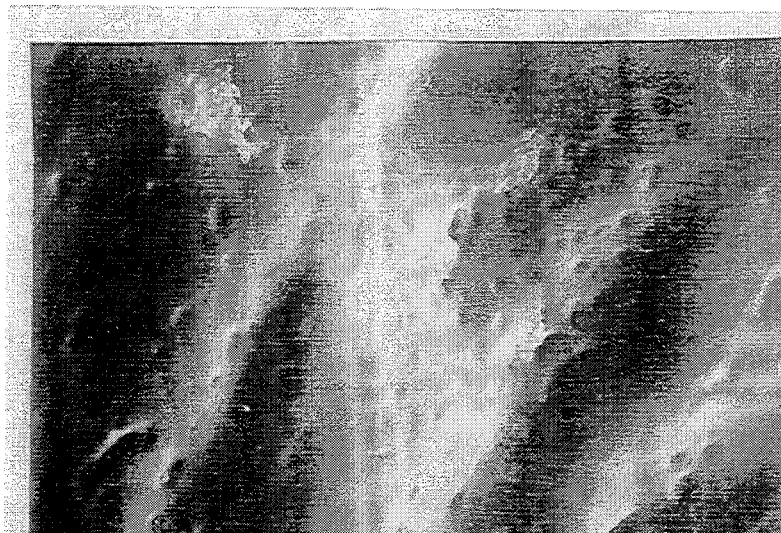
FIG. 16A is a photomicrograph at 5000× magnification showing the morphology of a face of an experimental polymeric membrane (Sample 31-8) which was solvent-cast under microgravity conditions according to the precepts of the present invention.
Figure 16B:
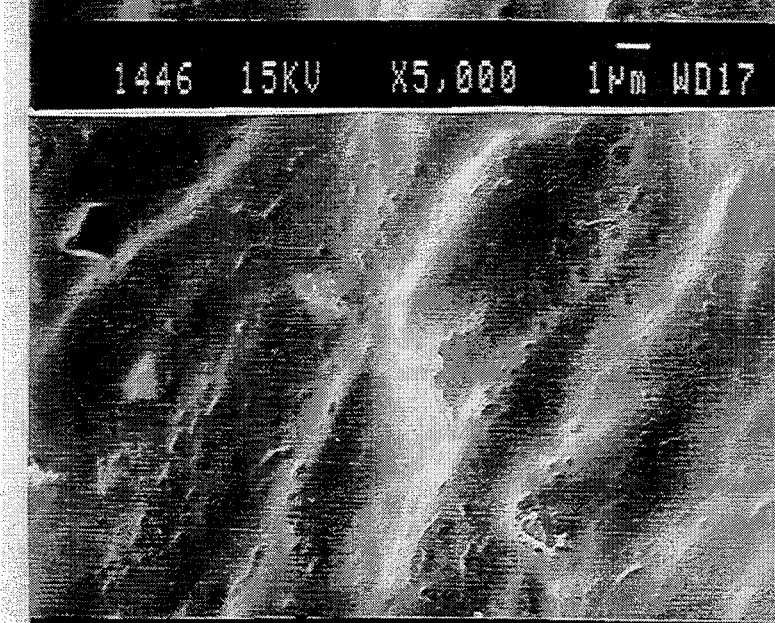
FIG. 16B is the photomicrograph of FIG. 16A shown at a magnification of 2500×.
Figure 16C:
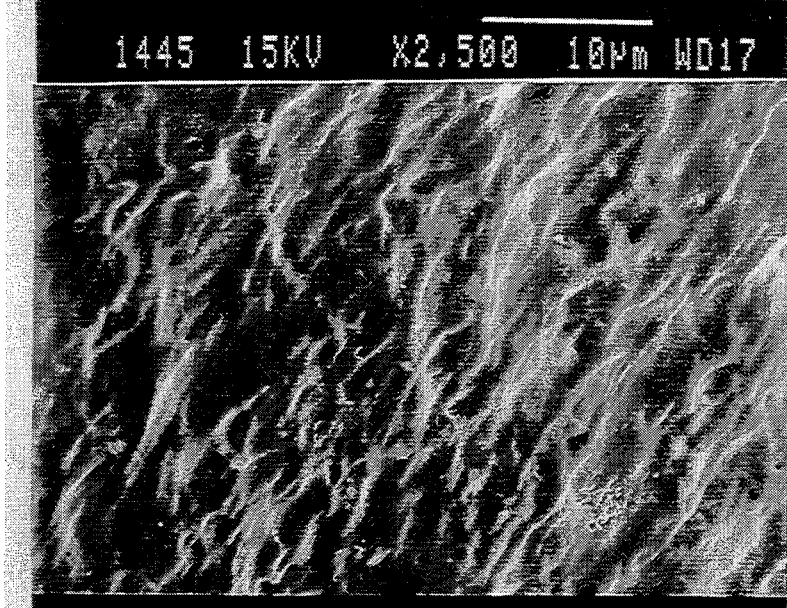
FIG. 16C is the photomicrograph of FIG. 16A shown at a magnification of 500×.
Figure 17A:
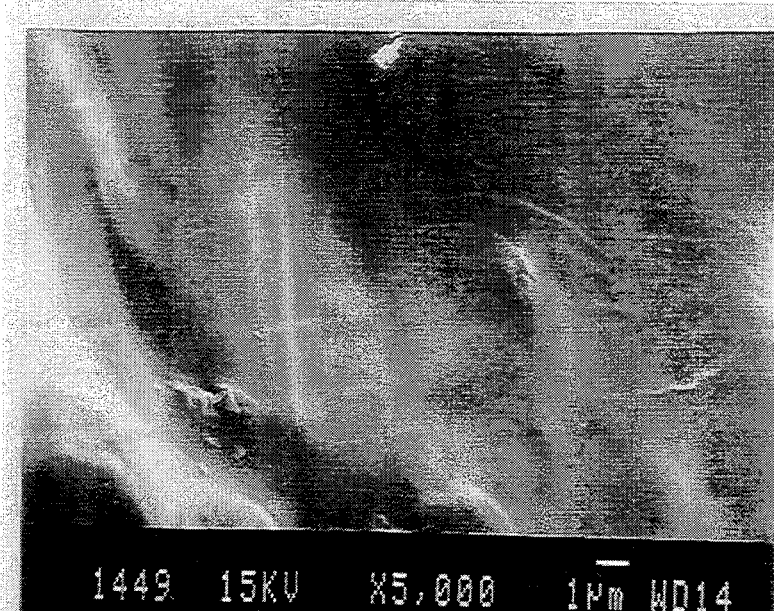
FIG. 17A is a photomicrograph at 5000× magnification showing the morphology of an edge of the polymeric membrane of FIG. 16A.
Figure 17B:
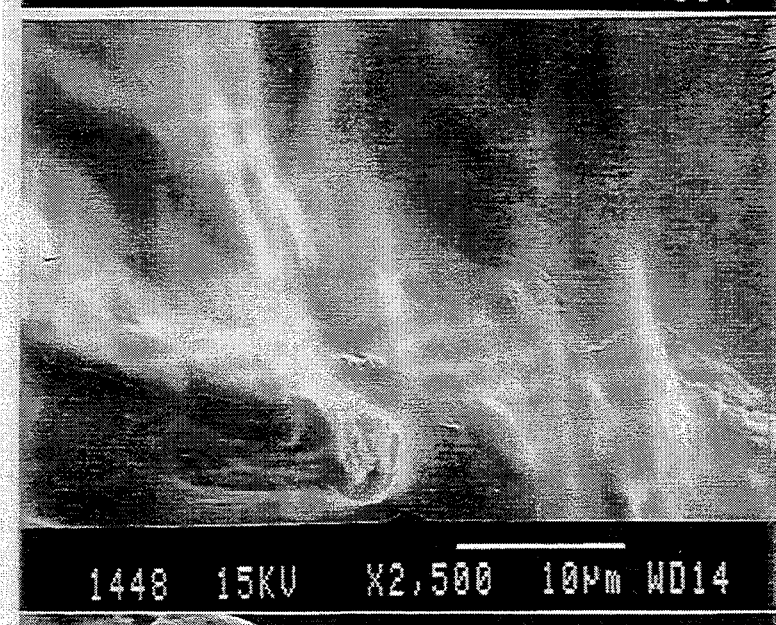
FIG. 17B is the photomicrograph of FIG. 17A shown at a magnification of 2500×.
Figure 17C:
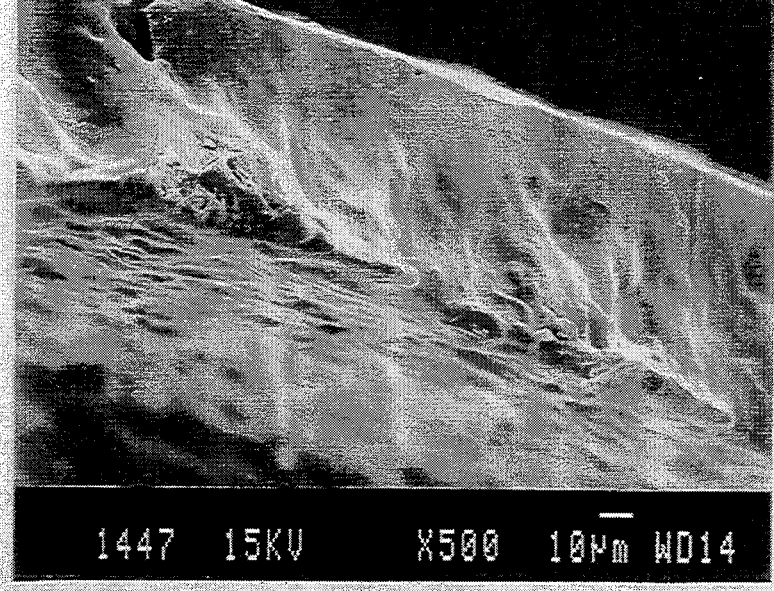
FIG. 17C is the photomicrograph of FIG. 17A shown at a magnification of 500×.
Figures 18A, 18B, 18C:
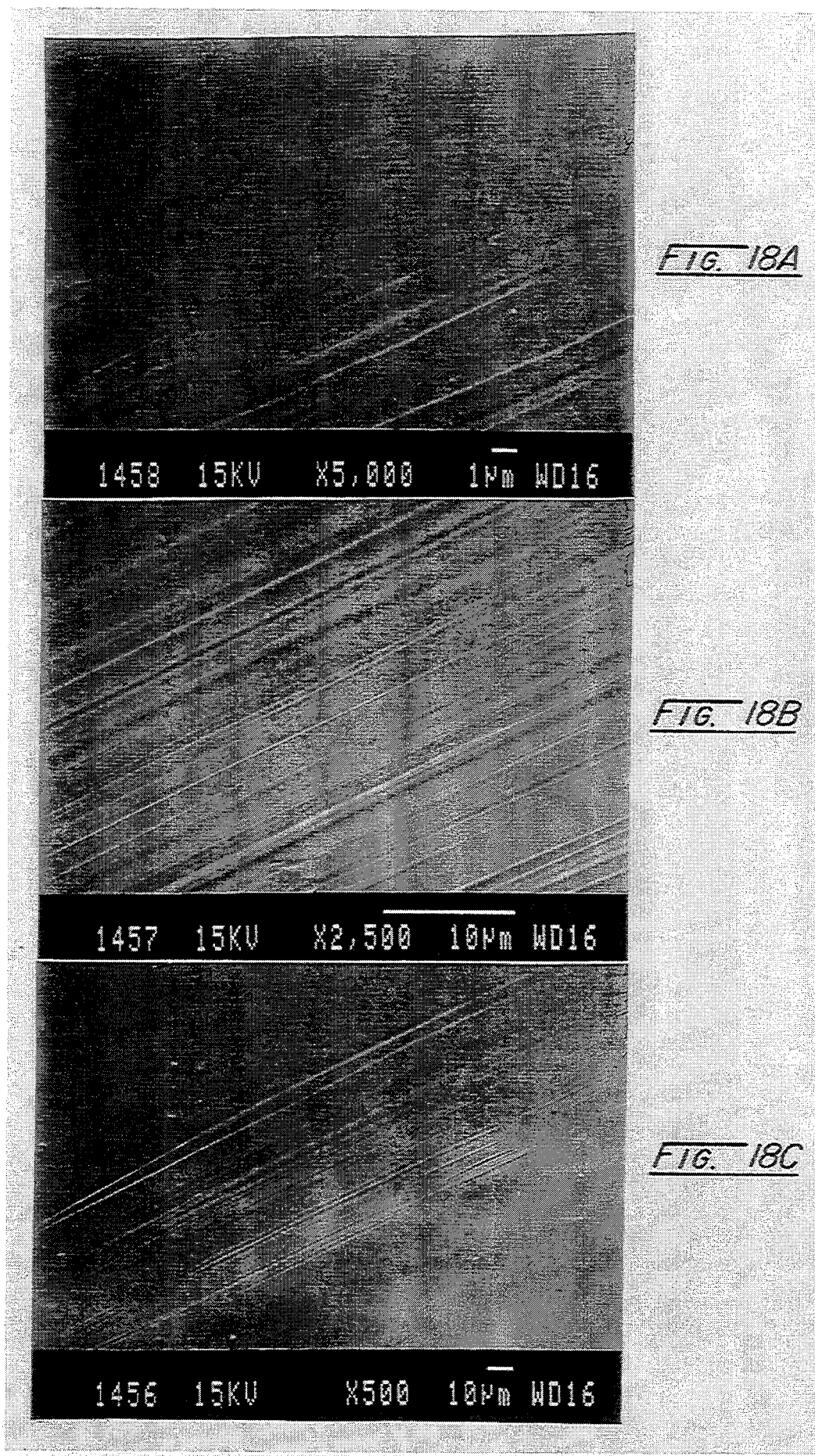
FIG. 18A is a photomicrograph at 5000× magnification showing the morphology of a face of an experimental polymeric membrane (Sample 31-10) which was solvent-cast under microgravity conditions according to the precepts of the present invention.
FIG. 18B is the photomicrograph of FIG. 18A shown at a magnification of 2500×.
FIG. 18C is the photomicrograph of FIG. 18A shown at a magnification of 500×.
Figure 19A:
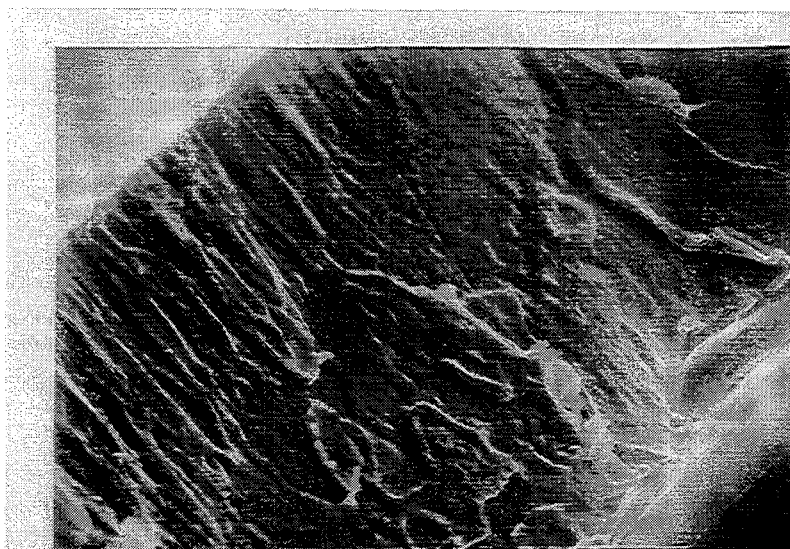
FIG. 19A is a photomicrograph at 5000× magnification showing the morphology of an edge of the polymeric membrane of FIG. 18A.
Figure 19B:
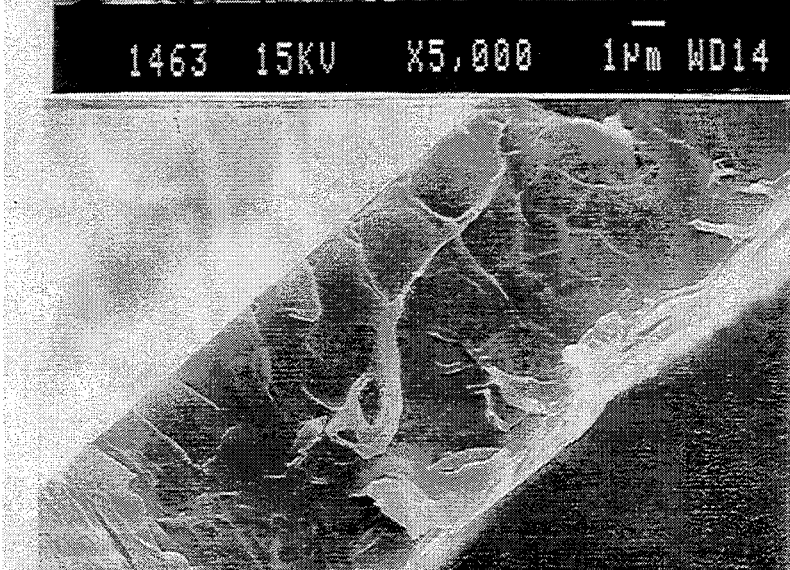
FIG. 19B is the photomicrograph of FIG. 19A shown at a magnification of 2500×.
Figure 19C:
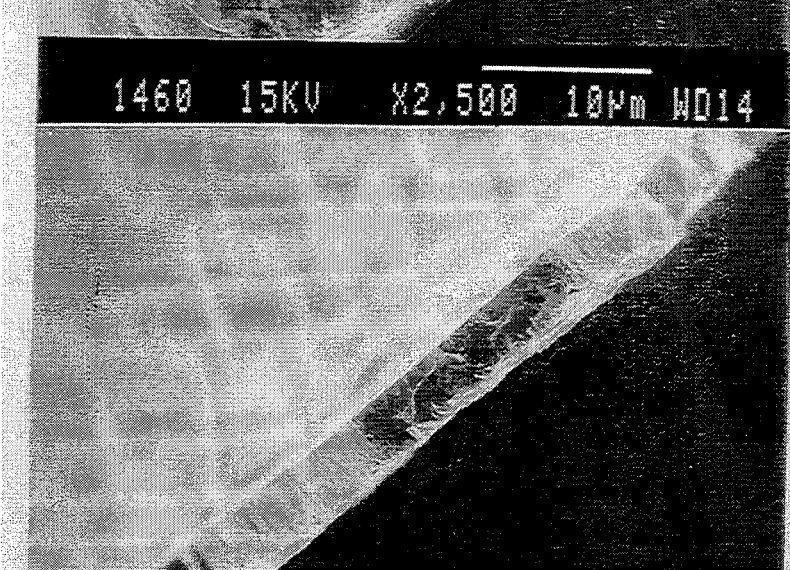
FIG. 19C is the photomicrograph of FIG. 19A shown at a magnification of 500×.
Figures 20A, 20B, 20C:
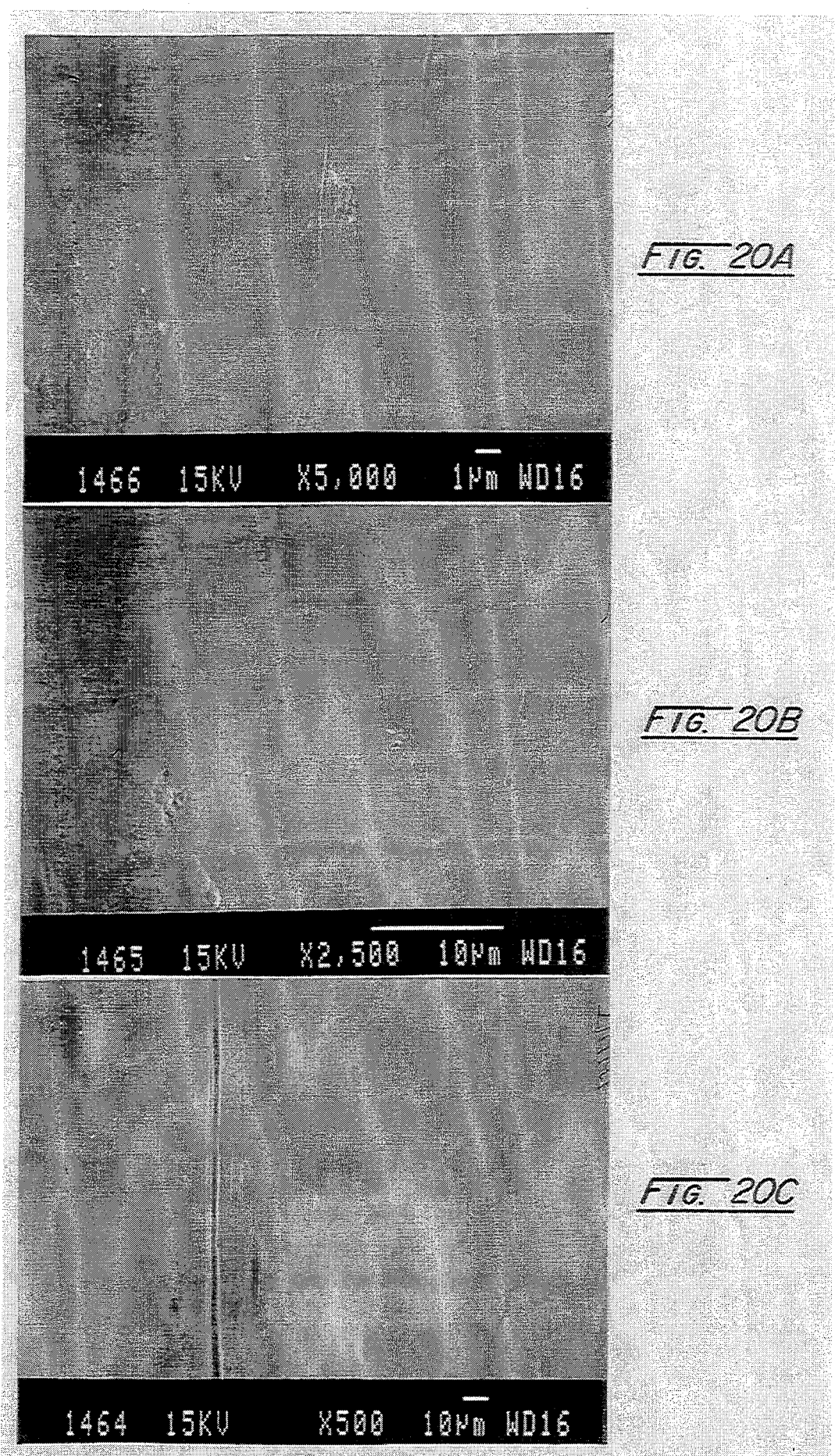
FIG. 20A is a photomicrograph at 5000× magnification showing the morphology of a face of an experimental polymeric membrane (Sample 31-11) which was solvent-cast under microgravity conditions according to the precepts of the present invention.
FIG. 20B is the photomicrograph of FIG. 20A shown at a magnification of 2500×.
FIG. 20C is the photomicrograph of FIG. 20A shown at a magnification of 500×.
Figure 21A:
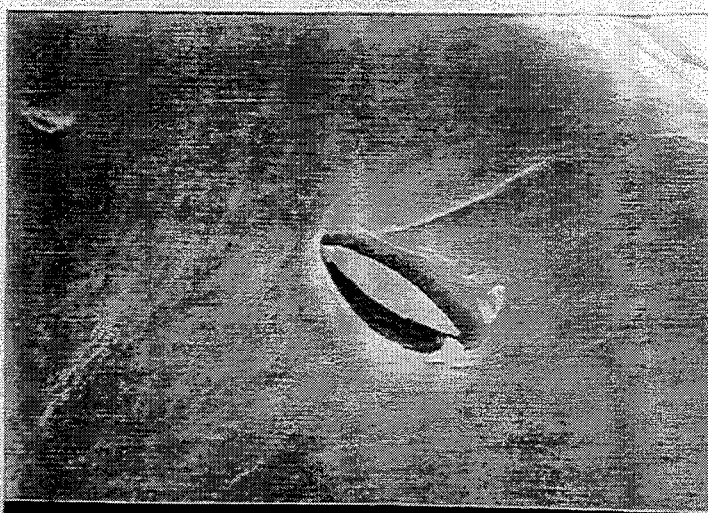
FIG. 21A is a photomicrograph at 5000× magnification showing the morphology of an edge of the polymeric membrane of FIG. 20A.
Figure 21B:
FIG. 21B is the photomicrograph of FIG. 21A shown at a magnification of 2500×.
Figure 21C:
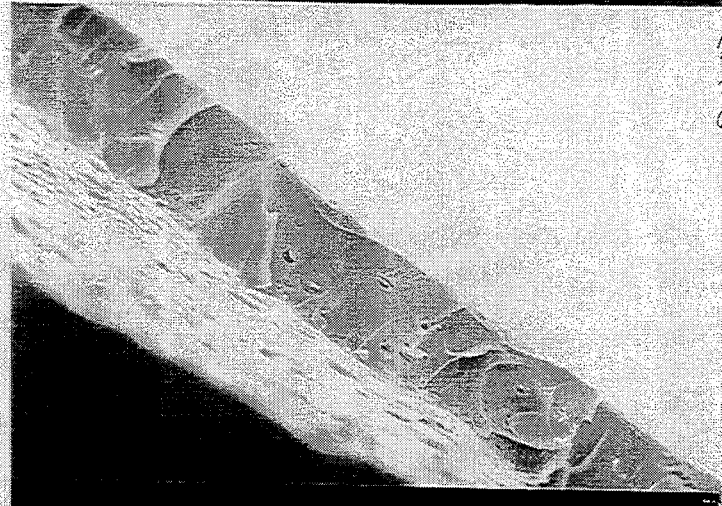
FIG. 21C is the photomicrograph of FIG. 21A shown at a magnification of 500×.

FIGS. 14A,14B,14C,15A,15B,15C,16A,16B,16C,17A,17B,17C,18A,18B, 18C,19A,19B,19C,20A,20B,20C,21A,21B and 21C are micrographs of the effects of reduced gravity on the formation of the polymer membrane structure. In all cases there appears to be very little macrosize porosity developed during the reduced gravity environment. The face view micrographs (FIGS. 14ABC, 16ABC, 18ABC, and 20ABC; Samples 44520-31-1, 31-8, 31-10, 31-11, respectively) are dense structures having little or no macroporosity, which is in direct contrast to the ground base control edge view samples (FIGS. 7ABC and 9ABC; Samples 31-14 and 31-15, respectively) and the high gravity edge view samples (FIGS. 11ABC and 13ABC, Samples 31-6 and 31-7, respectively).

STS-31 Studies

Figure 22:
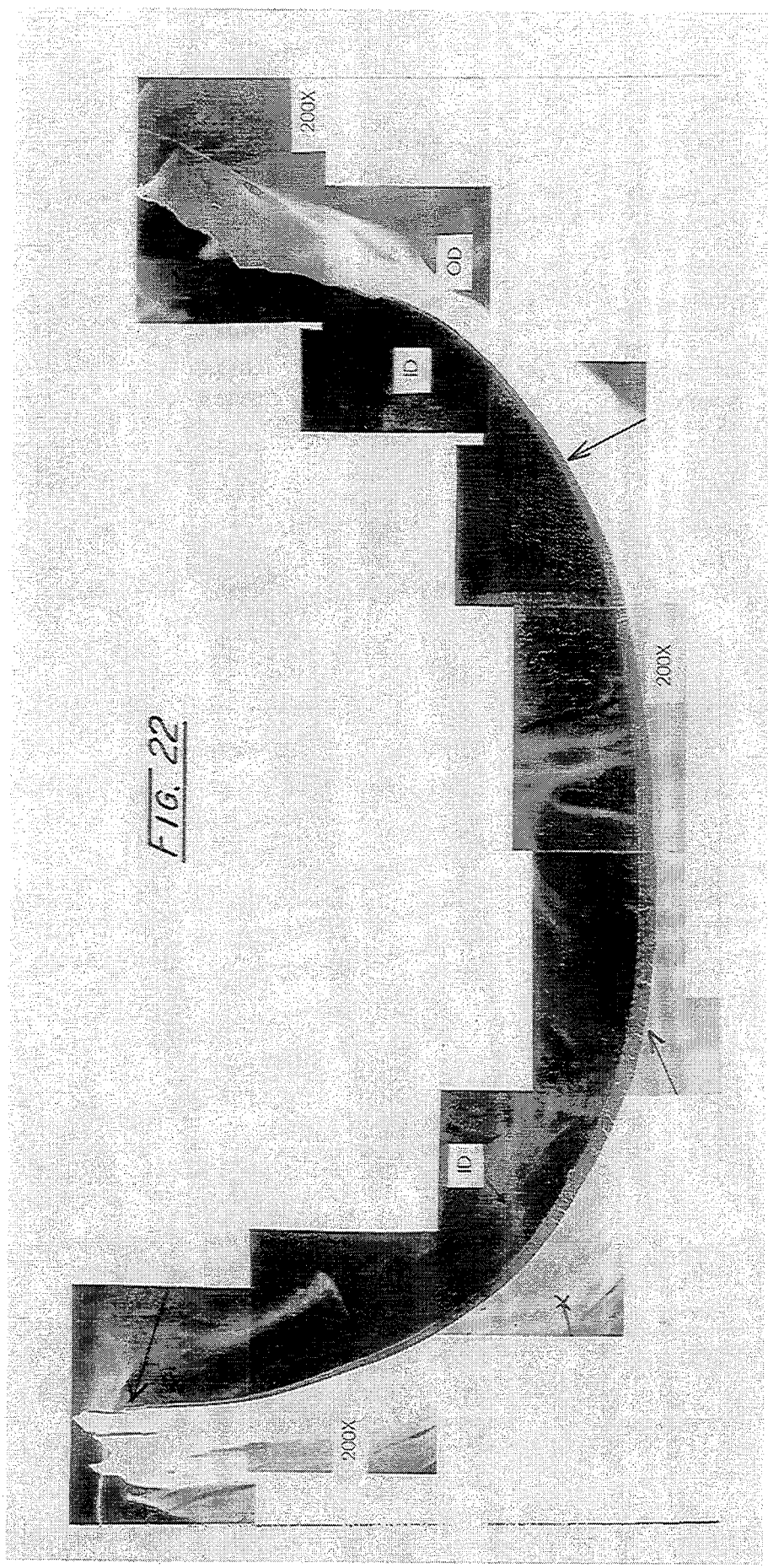
FIG. 22 is a composite photomicrograph at 200× magnification showing a complete edge view of a control polymeric membrane which was solvent-cast under normal gravitational conditions.
Figure 23A:
FIG. 23A is a photomicrograph at 500× magnification showing a section of the edge of the polymeric membrane of FIG. 22.
Figure 23B:
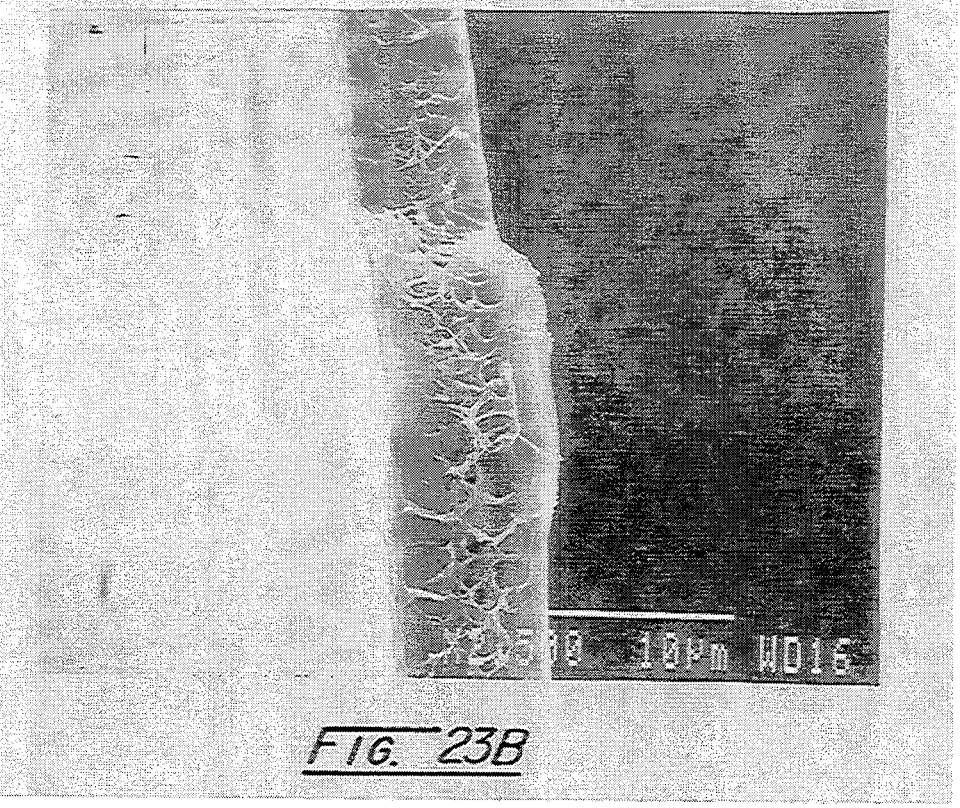
FIG. 23B is the photomicrograph of FIG. 23A shown at a magnification of 2500×.
Figure 23C:
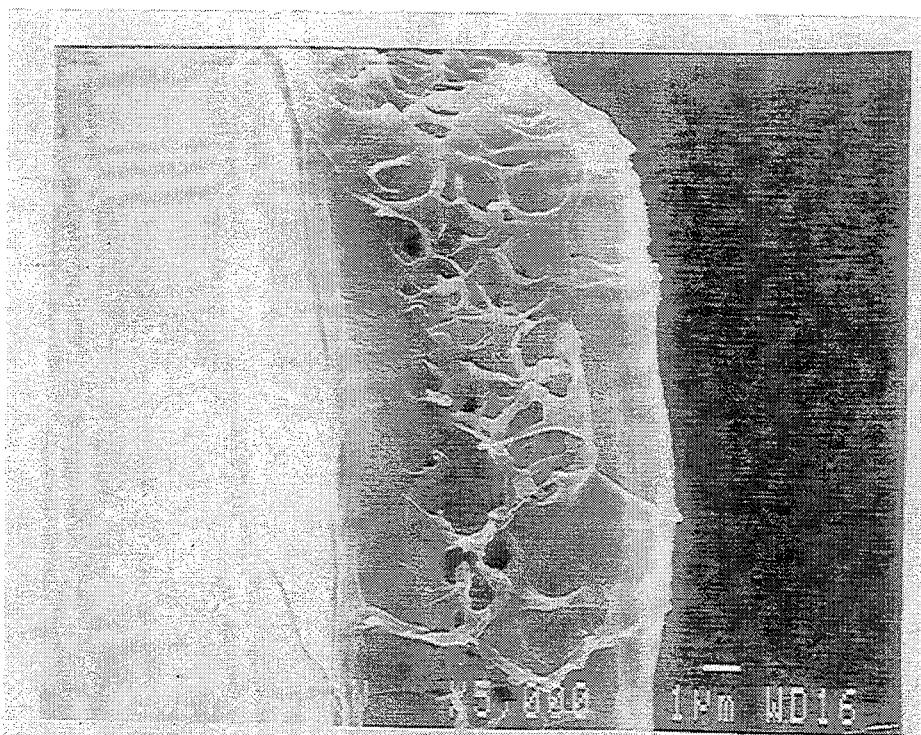
FIG. 23C is the photomicrograph of FIG. 23A shown at a magnification of 5000×.
Figure 23D:
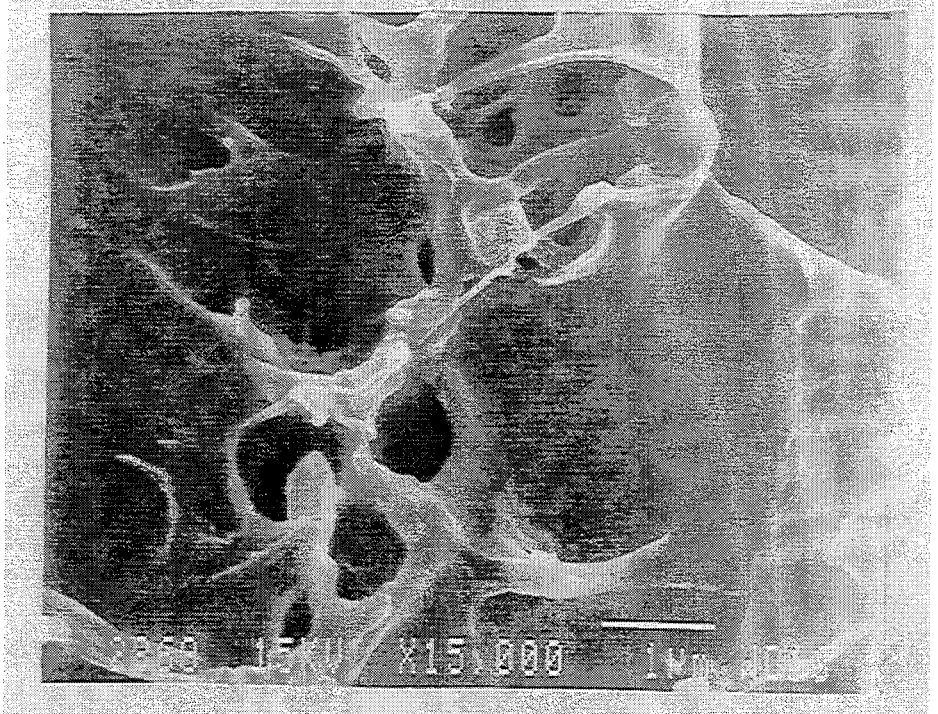
FIG. 23D is the photomicrograph of FIG. 23A shown at a magnification of 15,000×.
Figure 24A:
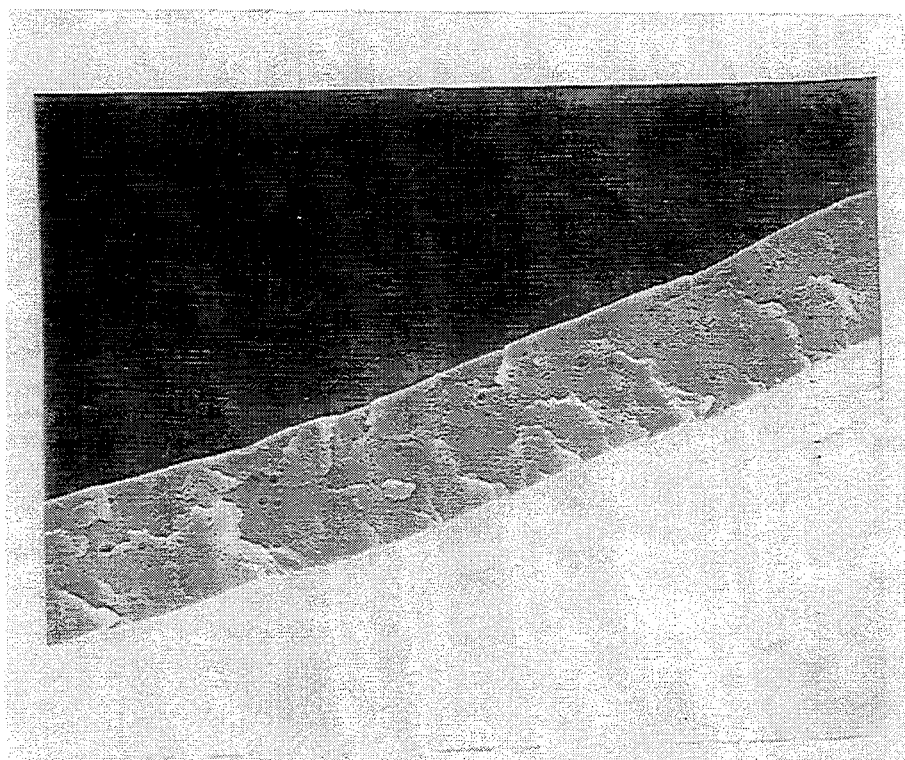
FIG. 24A is a photomicrograph at 500× magnification showing a section of the edge of the polymeric membrane of FIG. 22.
Figure 24B:
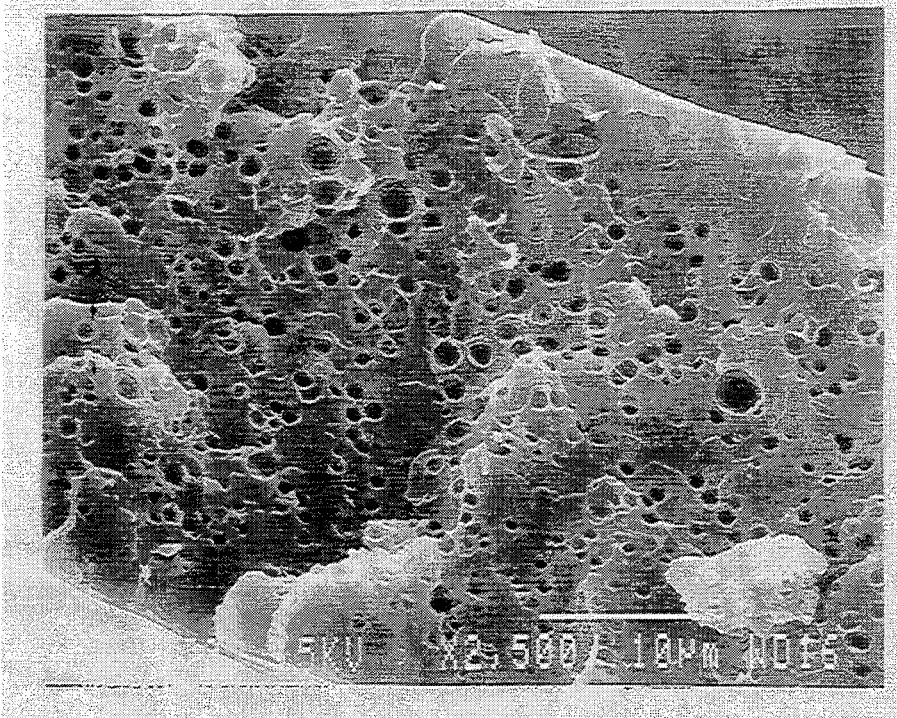
FIG. 24B is the photomicrograph of FIG. 24A shown at a magnification of 2500×.
Figure 24C:
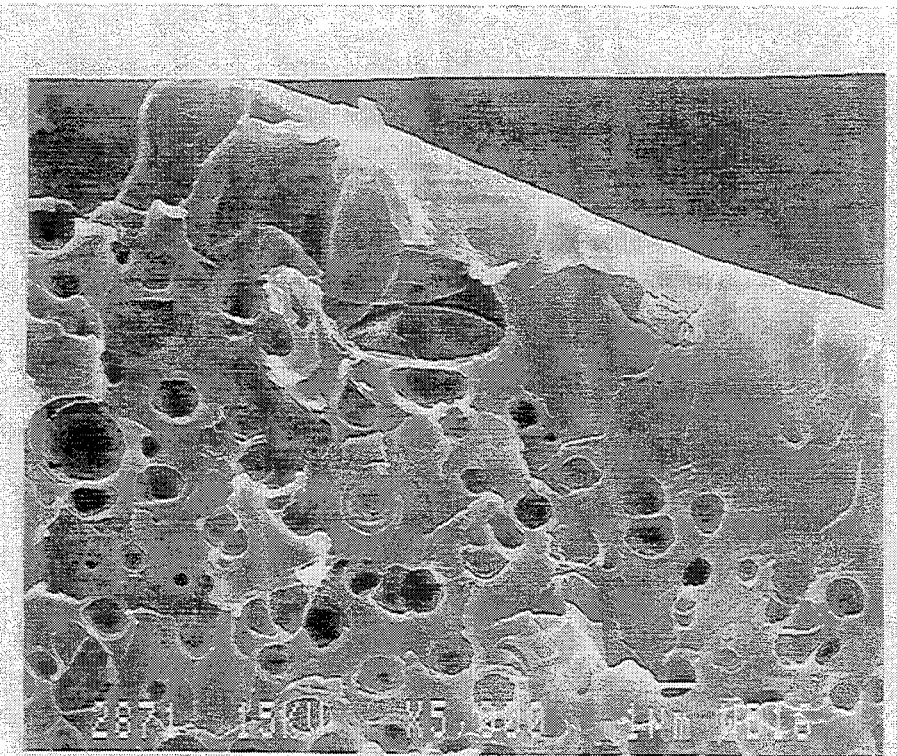
FIG. 24C is the photomicrograph of FIG. 24A shown at a magnification of 5000×.
Figure 24D:
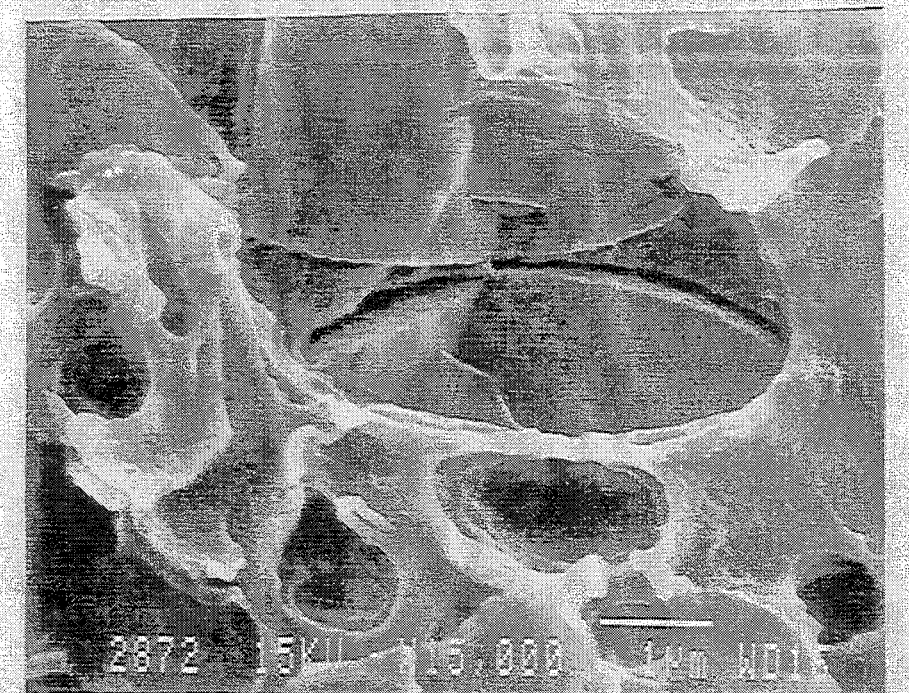
FIG. 24D is the photomicrograph of FIG. 24A shown at a magnification of 15,000×.
Figure 25A:
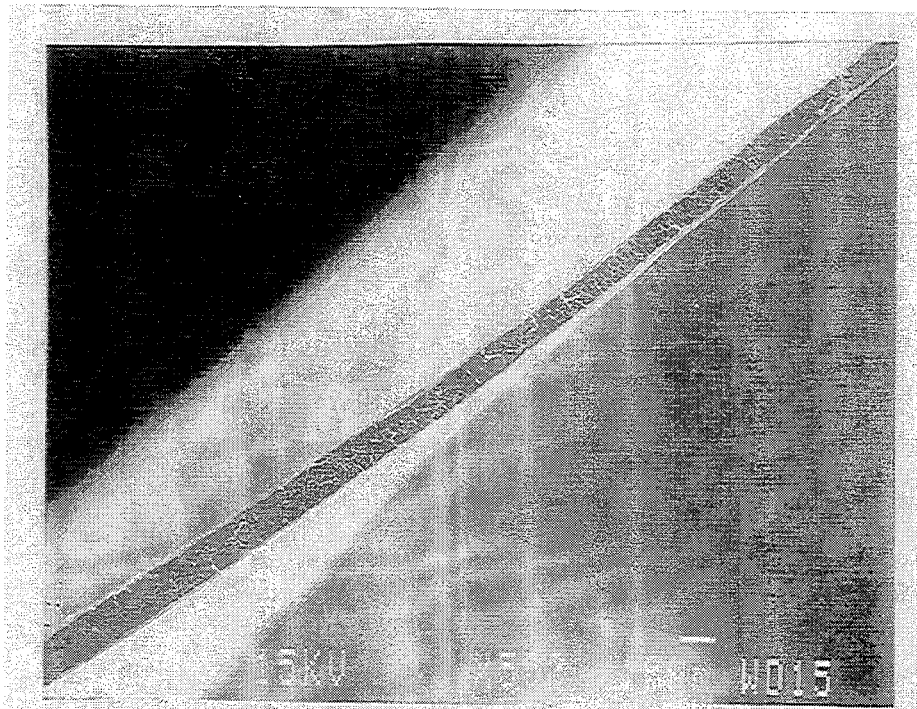
FIG. 25A is a photomicrograph at 500× magnification showing a section of the edge of the polymeric membrane of FIG. 22.
Figure 25B:
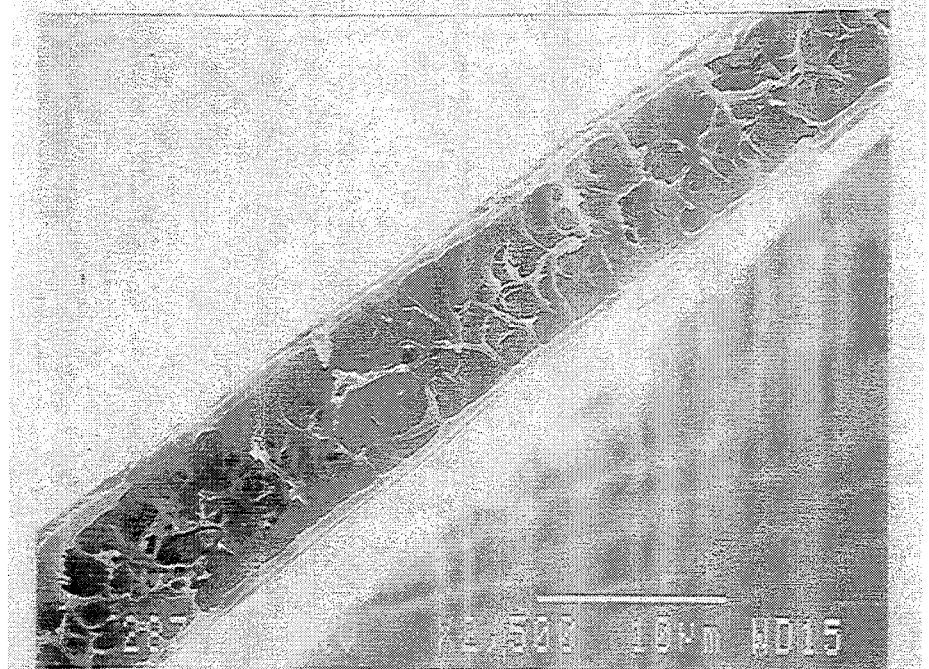
FIG. 25B is the photomicrograph of FIG. 25A shown at a magnification of 2500×.
Figure 25C:
FIG. 25C is the photomicrograph of FIG. 25A shown at a magnification of 5000×.
Figure 25D:
FIG. 25D is the photomicrograph of FIG. 25A shown at a magnification of 15,000×.

Ground base and STS-31 film samples taken from the surface of the sample tube holder are shown in FIGS. 22 (ground base), and 26 and 27 (STS-31). SEM sample preparation methods included room temperature tensile rupture of the film, liquid $N_2$ fracture of the films, and as-is films. No matter which method was used to rupture or fracture the film, the morphological characteristics of the individual films were the same, e.g. presence or absence of porosity.

Figures 26, 27:
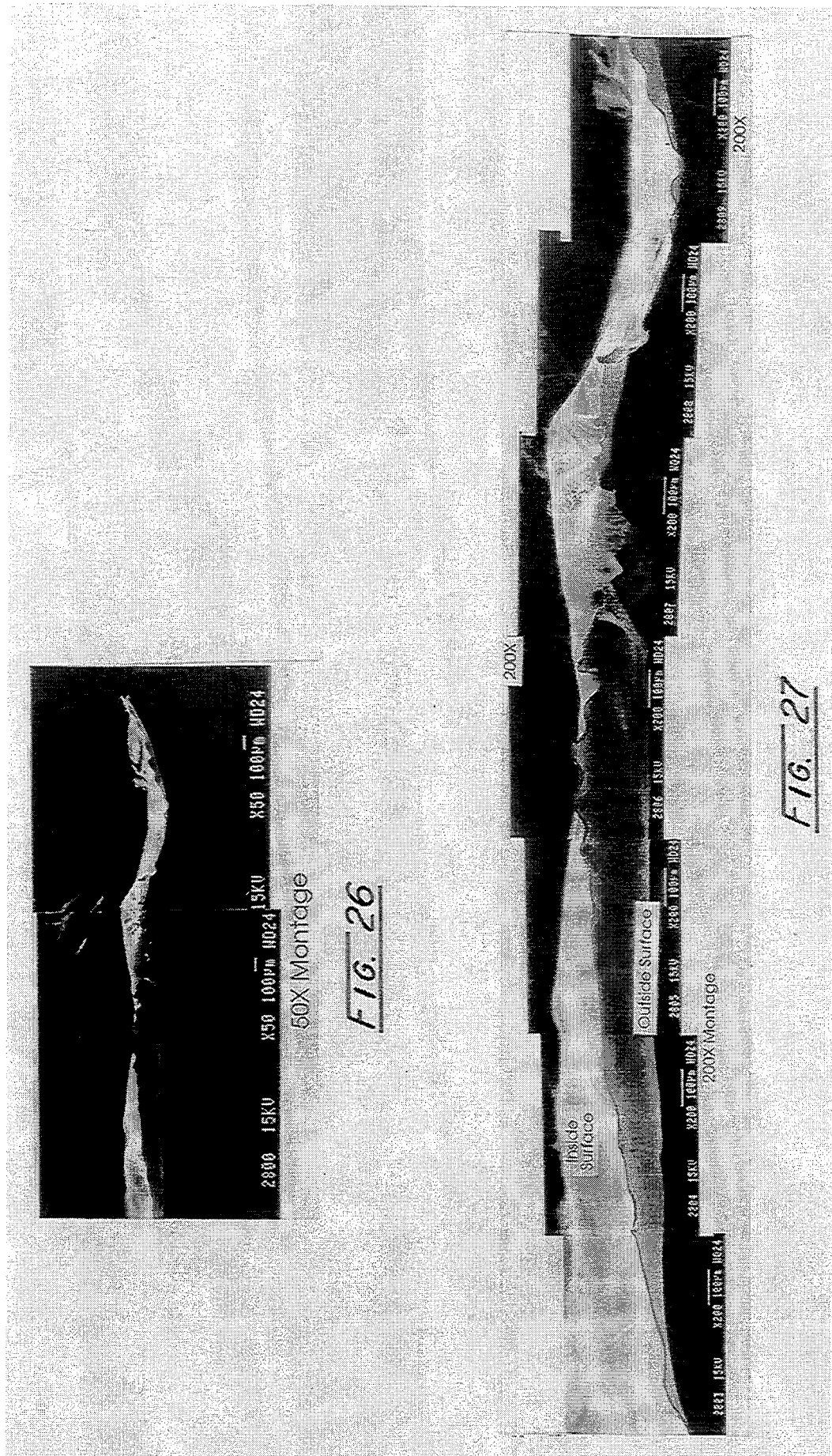
FIG. 26 is a composite photomicrograph at 50× magnification showing a complete edge view of an experimental polymeric membrane which was solvent-cast under microgravity conditions according to the precepts of the present invention.
FIG. 27 is a composite photomicrograph of a complete edge view of the polymeric membrane of FIG. 25 shown at 200× magnification.
Figure 28A:
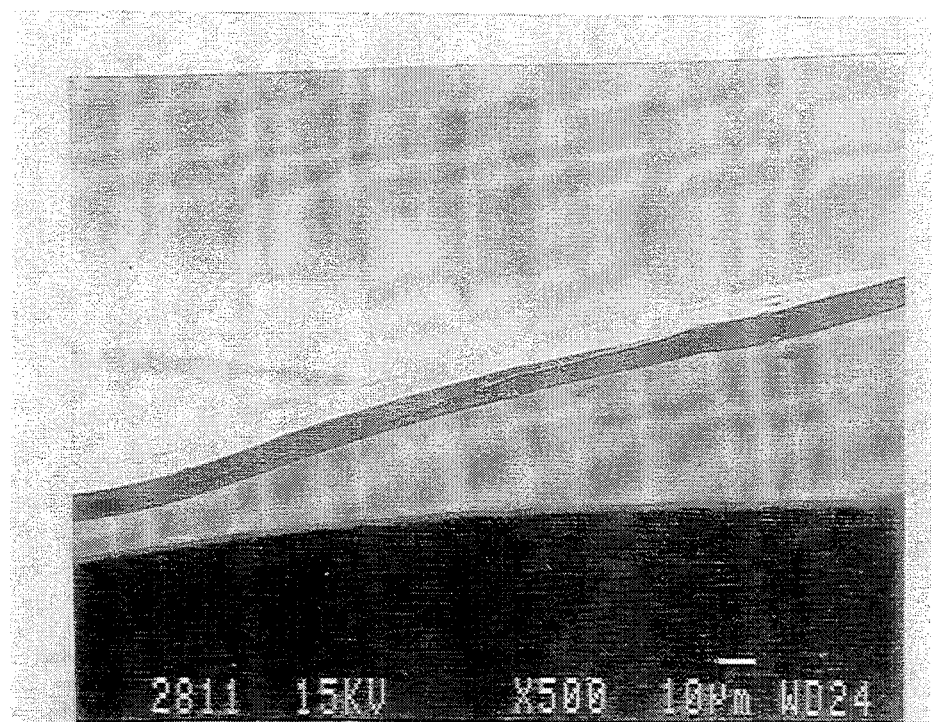
FIG. 28A is a photomicrograph at 500× magnification showing a section of the edge of the polymeric membrane of FIG. 27.
Figure 28B:
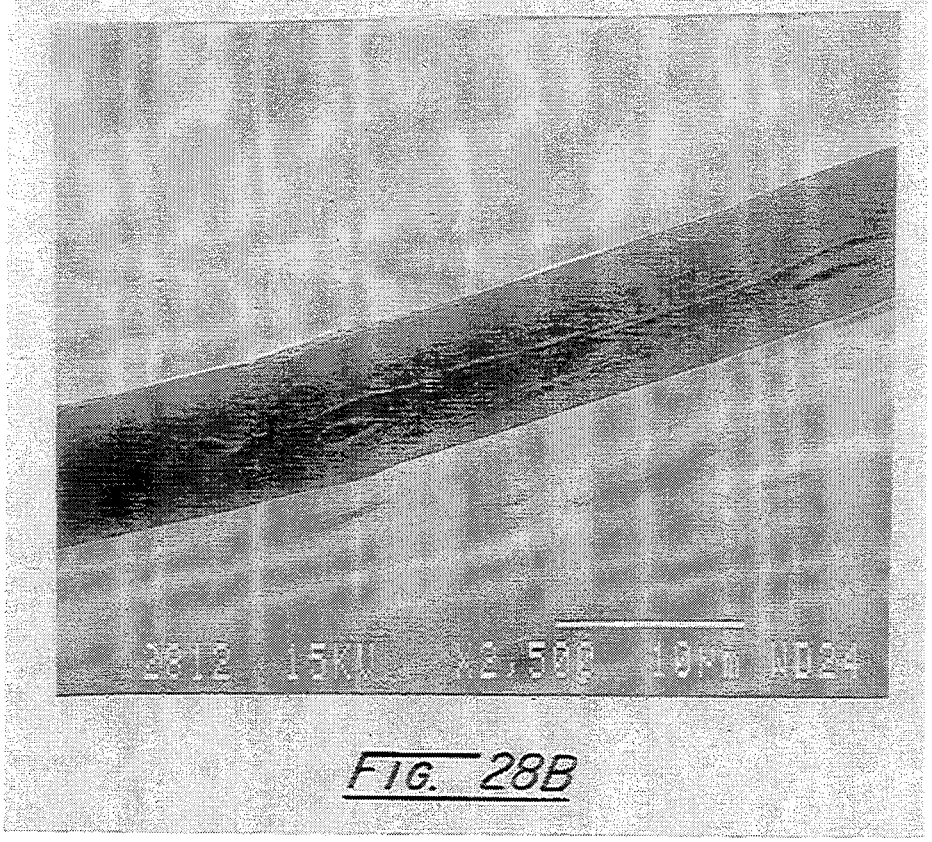
FIG. 28B is the photomicrograph of FIG. 28A shown at a magnification of 2500×.
Figure 28C:
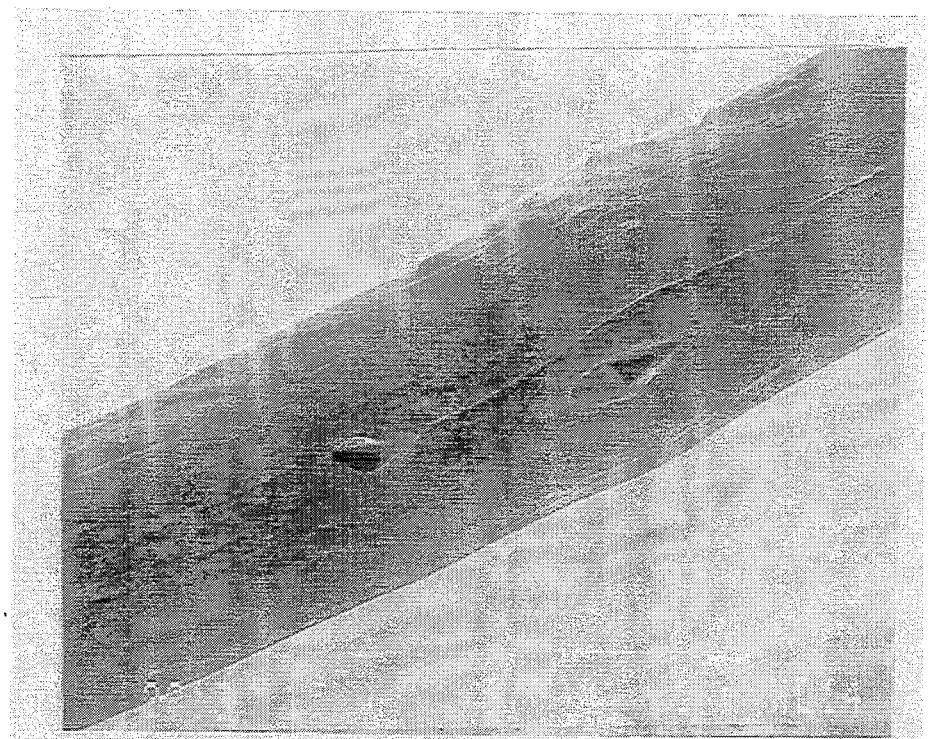
FIG. 28C is the photomicrograph of FIG. 28A shown at a magnification of 5000×.
Figure 28D:
FIG. 28D is the photomicrograph of FIG. 28A shown at a magnification of 15,000×.
Figure 29A:
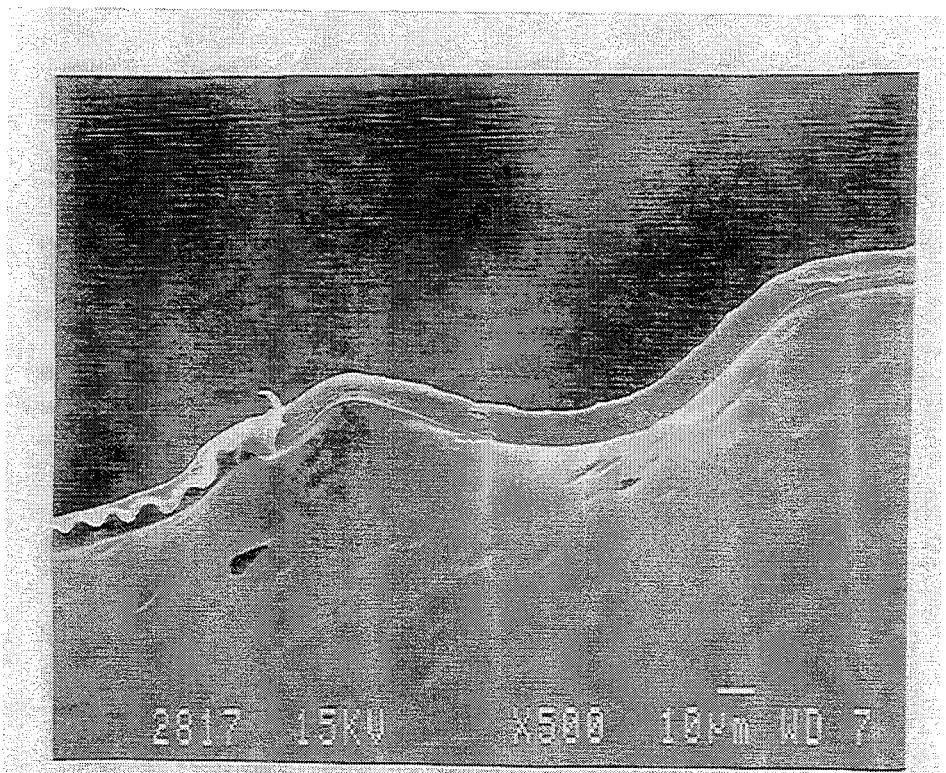
FIG. 29A is a photomicrograph at 500× magnification showing a section of the edge of the polymeric membrane of FIG. 27.
Figure 29B:
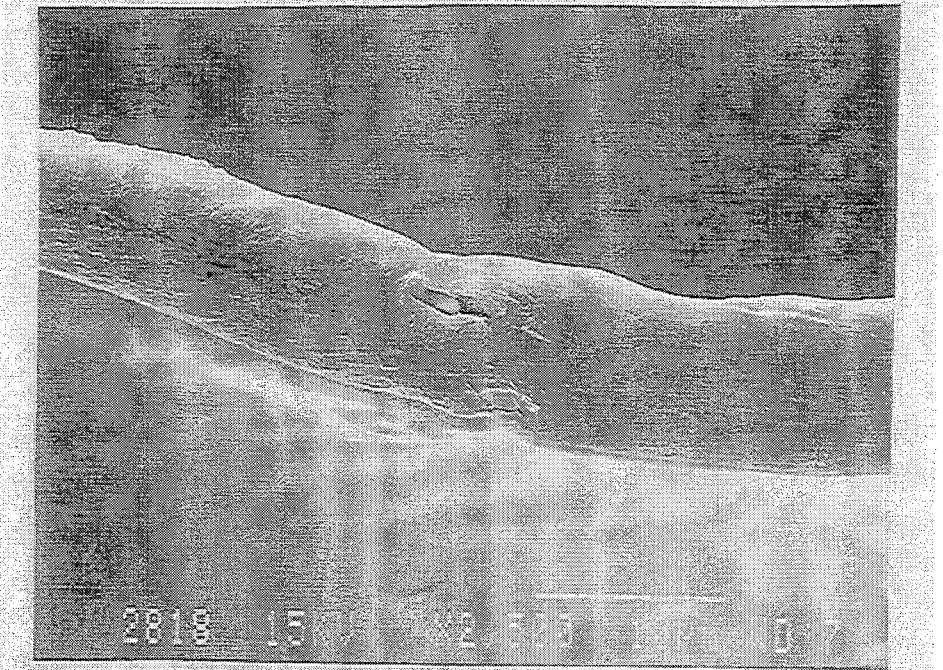
FIG. 29B is the photomicrograph of FIG. 29A shown at a magnification of 2500×.
Figure 29C:
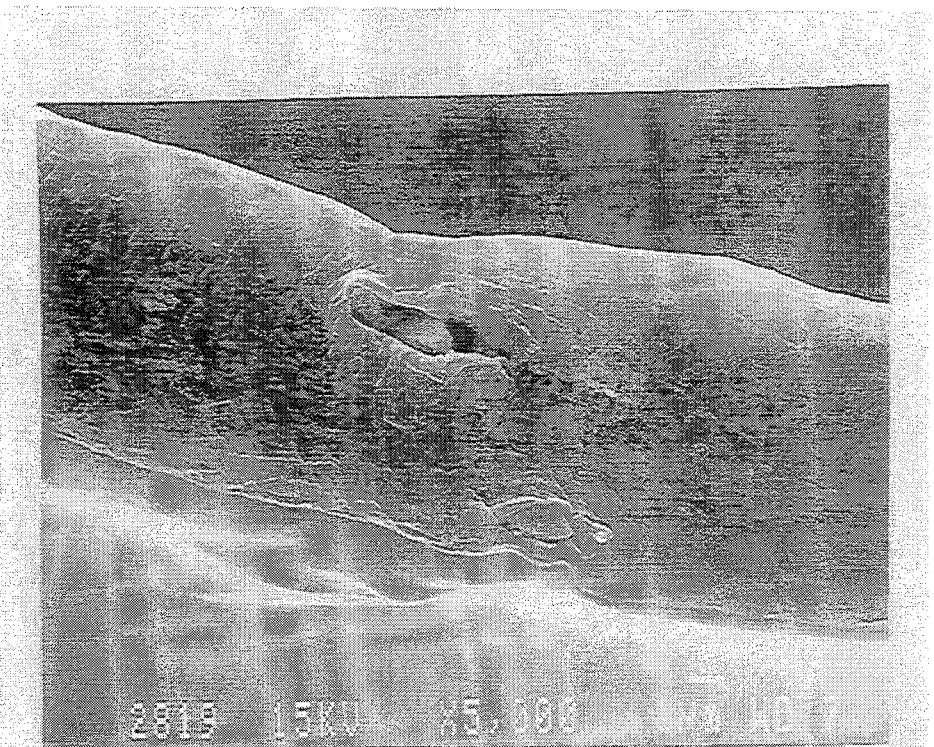
FIG. 29C is the photomicrograph of FIG. 29A shown at a magnification of 5000×.
Figure 29D:
FIG. 29D is the photomicrograph of FIG. 29A shown at a magnification of 15,000×.
Figure 30A:
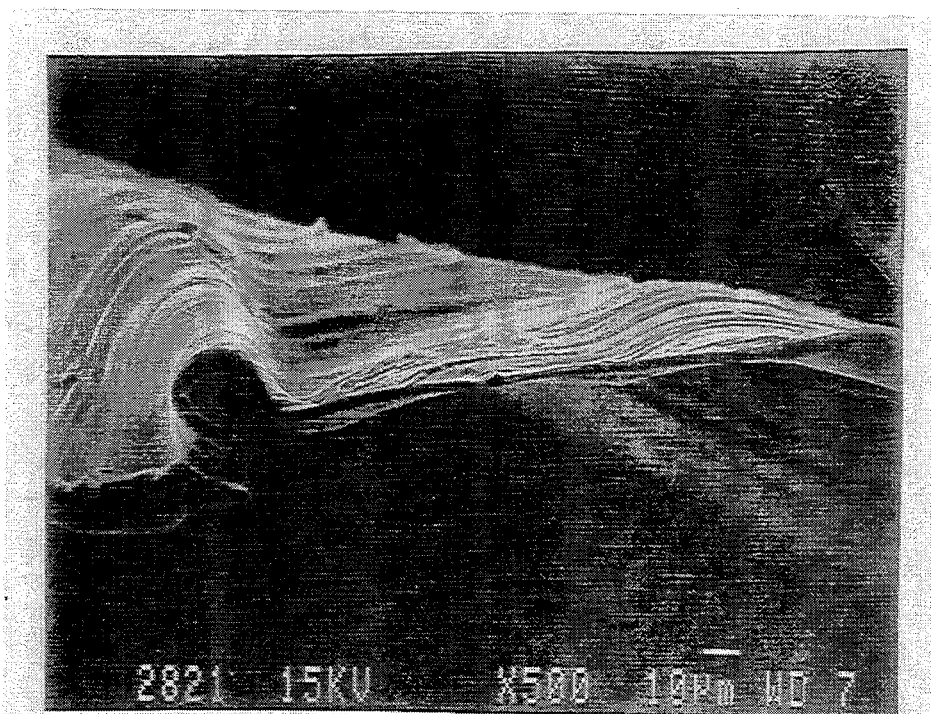
FIG. 30A is a photomicrograph at 500× magnification showing a section of the edge of the polymeric membrane of FIG. 27.
Figure 30B:
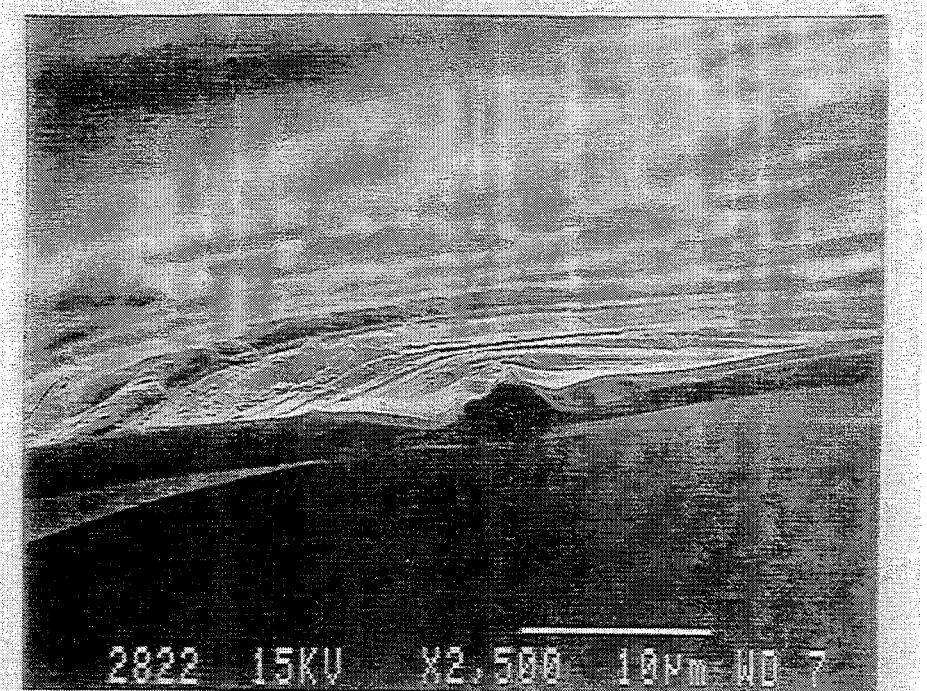
FIG. 30B is the photomicrograph of FIG. 30A shown at a magnification of 2500×.
Figure 30C:
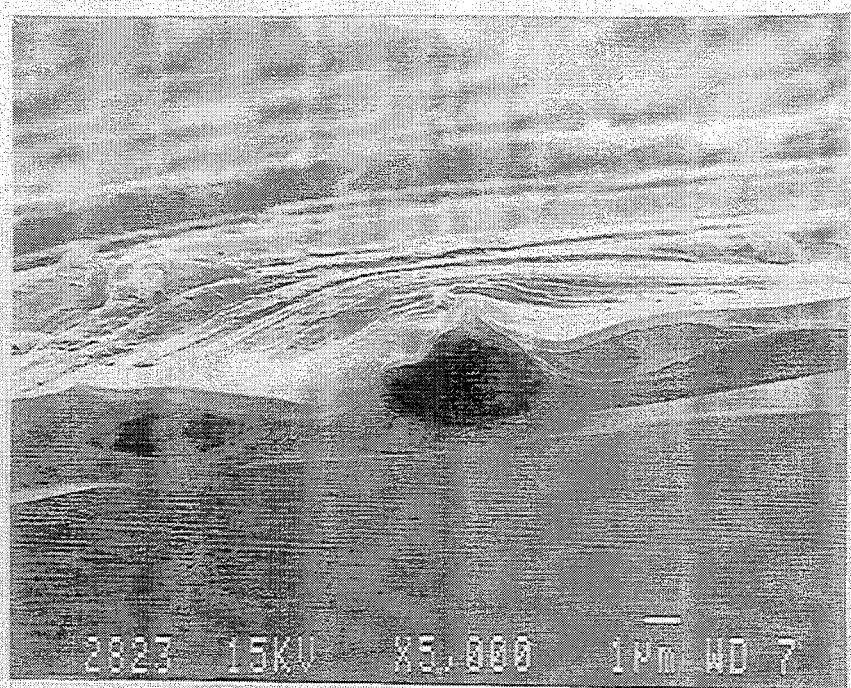
FIG. 30C is the photomicrograph of FIG. 30A shown at a magnification of 5000×.
Figure 30D:
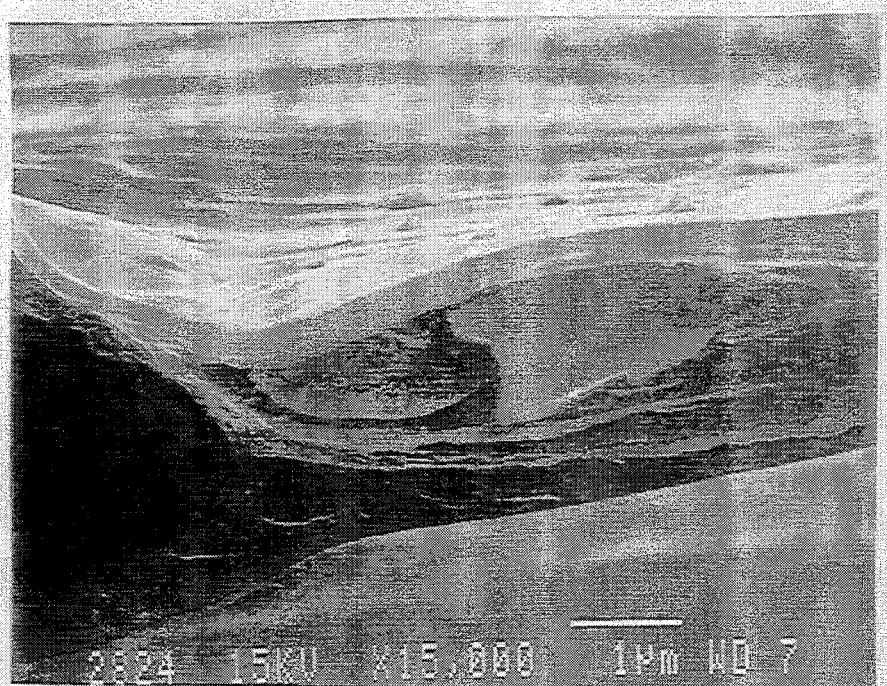
FIG. 30D is the photomicrograph of FIG. 30A shown at a magnification of 15,000×.

FIG. 22 is a complete view of the entire edge of a ground base control film. Close-up details of various sections along the edge of this film at different magnifications also are shown in FIGS. 22,23A,23B,23C,23D,24A,24B,24C,24D,25A,25B,25C and 25D with their location delineated on FIG. 22 by lines 23-25, respectively. In all cases, there is large amount of porosity or void formation with the ground base control samples. In stark contrast to the ground base control samples, film structures from the STS-31 flight do not exhibit the same degree of porosity. FIGS. 26 and 27 are complete edge views of the STS-31 film sample at different magnifications. Close-up details of various sections of these edge samples at different magnifications also are shown in FIGS. 28A,28B,28C,28D,29A,29B,29C,29D,30A,30B,30C and 30D with their location delineated on FIG. 27 by lines 28-30, respectively. In all cases, there is very little pore formation in the STS-31 film samples and film structures appear to be very dense in their nature.

Example 5

Another difference between membrane structures produced in microgravity and those produced under ground base conditions is the degree of microporosity formed in the membrane during the evaporation process.

A direct comparison was made between the microporosity in a ground base film and a film produced under reduced gravity (KC-135 flight) or microgravity (space shuttle) conditions. The microporosity of a film was determined by placing the film samples on very sensitive quartz spring balances contained in a vacuum chamber followed by vacuum evaporation of the film structures over a 12-hour time period. After all of the air had been removed from the film structure by the vacuum evaporation process, water vapor was allowed to enter the vacuum chamber and absorb into the micropores of the membranes. When water is absorbed by the membrane, it gains weight which can be observed and measured by following the change in length of the very sensitive quartz spring balance.

TABLE 4

| Gravity Environment | Water Vapor Absorbed by the Film Sample (%) |
| --- | --- |
| Ground Base (Control, 1 g) | 0.6 |
| KC-135 Flight ($10^{-2}$ g) | 4.0 |
| Space Shuttle ($10^{-4}$ g) | 10.0 |

In all cases, the films prepared under reduced gravity had a higher degree of microporosity (more uptake of water vapor or higher weight gain) than their ground base counterparts. The micropores of the reduced gravity film-produced samples measured 1,800 Å, as determined by transmission electron microscopy.

We claim:

1. In a method for making a solvent cast thermoplastic polymeric membrane from a solution comprising a thermoplastic polymer dissolved in a solvent, the improvement for reducing the incidences of voids which comprises the steps of:
    (a) casting said solution under gravitational conditions comprising from about $10^{-6}$ to about $10^{-2}$ g; and
    (b) evaporating the solvent from the cast solution under said gravitational conditions to form said membrane.

2. The method of claim 1 wherein said solvent is one or more of an organic solvent or water.

3. The method of claim 1 wherein said membrane ranges in thickness from about 2 to 300 microns.

* * * * *